(12) United States Patent
Konishi et al.

(10) Patent No.: US 12,646,335 B2
(45) Date of Patent: Jun. 2, 2026

(54) EXTERNAL ENVIRONMENT RECOGNITION APPARATUS

(71) Applicant: Honda Motor Co., Ltd., Tokyo (JP)

(72) Inventors: Shunsuke Konishi, Wako (JP); Ryota Okutsu, Tokyo (JP); Hidetoshi Utsumi, Wako (JP); Fumihiro Aoki, Wako (JP); Shuhei Masuoka, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 258 days.

(21) Appl. No.: 18/587,383

(22) Filed: Feb. 26, 2024

(65) Prior Publication Data

US 2024/0331408 A1 Oct. 3, 2024

(30) Foreign Application Priority Data

Mar. 27, 2023 (JP) ................................. 2023-050242

(51) Int. Cl.
*G06V 20/56* (2022.01)
*G01C 21/34* (2006.01)
(Continued)

(52) U.S. Cl.
CPC ....... *G06V 20/588* (2022.01); *G01C 21/3407* (2013.01); *G01S 7/4808* (2013.01);
(Continued)

(58) Field of Classification Search
CPC .... G06V 20/588; G06V 20/58; G06V 10/145; G06V 20/56; G06V 20/64; G01S 17/08;
(Continued)

(56) References Cited

U.S. PATENT DOCUMENTS

2012/0319888 A1* 12/2012 Suzuki ..................... G08G 1/16
342/107
2021/0311191 A1* 10/2021 Nagashima ............. G01S 17/08
(Continued)

FOREIGN PATENT DOCUMENTS

JP 2013140515 A * 7/2013
JP 2020149079 A * 9/2020
(Continued)

OTHER PUBLICATIONS

Japanese Office action; Application 2023-050242; pp. 1-6, Jan. 7, 2025.

*Primary Examiner* — Emily C Terrell
*Assistant Examiner* — Daniella M. DiGuglielmo
(74) *Attorney, Agent, or Firm* — Duft & Bornsen, PC

(57) ABSTRACT

An external environment recognition apparatus includes an in-vehicle detector and a microprocessor. The microprocessor is configured to perform: recognizing a surface of the road and a three-dimensional object on the road for each frame as the road surface information based on a three-dimensional point cloud data including distance information for every one of a plurality of detection points in a matrix shape acquired in every frame by the in-vehicle detector; determining an interval of detection points of the three-dimensional point cloud data as a scanning angular resolution of the electromagnetic wave based on a size of a predetermined three-dimensional object and a distance to the predetermined three-dimensional object; and taking a predetermined avoidance measure so that at least one of the scanning angular resolution and a number of detection points corresponding to the interval of detection points does not exceed a predetermined limit value.

10 Claims, 12 Drawing Sheets

(51) Int. Cl.

| | |
|---|---|
| *G01S 7/48* | (2006.01) |
| *G01S 17/08* | (2006.01) |
| *G01S 17/86* | (2020.01) |
| *G01S 17/89* | (2020.01) |
| *G01S 17/931* | (2020.01) |
| *G06V 10/145* | (2022.01) |
| *G06V 20/58* | (2022.01) |
| *G06V 20/64* | (2022.01) |

(52) U.S. Cl.
CPC .............. *G01S 17/08* (2013.01); *G01S 17/86* (2020.01); *G01S 17/89* (2013.01); *G01S 17/931* (2020.01); *G06V 20/56* (2022.01); *G06V 20/58* (2022.01); *G06V 20/64* (2022.01); *G01S 7/4802* (2013.01); *G06V 10/145* (2022.01)

(58) Field of Classification Search
CPC ........ G01S 17/89; G01S 17/86; G01S 17/931; G01S 7/4802; G01S 7/4808; G01C 21/3407
See application file for complete search history.

(56) References Cited

U.S. PATENT DOCUMENTS

| | | | | |
|---|---|---|---|---|
| 2022/0227387 A1* | 7/2022 | Ozaki | .................. | G06V 20/588 |
| 2022/0390608 A1* | 12/2022 | Park | ...................... | G01S 17/931 |

FOREIGN PATENT DOCUMENTS

| | | |
|---|---|---|
| JP | 007225400 B | 2/2023 |
| WO | 2011092813 A1 | 8/2011 |
| WO | 2020110801 A1 | 6/2020 |

* cited by examiner (FROM FIG.9B)

2

START

S10

ACQUIRE POINT CLOUD DATA

S20

SEPARATE ROAD SURFACE DATA

S30

CALCULATE ROAD SURFACE GRADIENT

S40

ACQUIRE MAXIMUM DEPTH DISTANCE

S50

CALCULATE LIGHT PROJECTION ANGLE IN THE
VERTICAL DIRECTION AND DISTANCE TO ROAD
SURFACE POINT AT EACH DEPTH DISTANCE

S60

CALCULATE REQUIRED ANGULAR RESOLUTION
AT EACH DEPTH DISTANCE

EXTERNAL ENVIRONMENT RECOGNITION APPARATUS

CROSS-REFERENCE TO RELATED APPLICATION

This application is based upon and claims the benefit of priority from Japanese Patent Application No. 2023-050242 filed on Mar. 27, 2023, the content of which is incorporated herein by reference.

BACKGROUND OF THE INVENTION

Field of the Invention

The present invention relates to an external environment recognition apparatus for recognizing an external environment situation of a vehicle.

Description of the Related Art

As a device of this type, there is known a device for respectively changing the irradiation angles of laser light irradiated from a LiDAR with a first axis parallel to a height direction as the center and with a second axis parallel to a horizontal direction as the center, scanning, and detecting an external environment of a vehicle based on position information of each detection point (for example, see JP 2020-149079 A).

In the above device, there are numerous detection points (irradiation points of the laser light) acquired by scanning, and a processing load for acquiring position information based on each detection point is large.

SUMMARY OF THE INVENTION

An aspect of the present invention is an external environment recognition apparatus including: an in-vehicle detector configured to scan and emit an electromagnetic wave in a first direction and as a second direction intersecting the first direction to detect an external environment situation around a subject vehicle; a microprocessor configured to acquire road surface information of a road on which the subject vehicle travels based on a detection data of the in-vehicle detector; and a memory coupled to the microprocessor. The microprocessor is configured to perform: recognizing a surface of the road and a three-dimensional object on the road for each frame as the road surface information based on the three-dimensional point cloud data including distance information for every one of a plurality of detection points in a matrix shape acquired in every frame by the in-vehicle detector; determining an interval of detection points of the three-dimensional point cloud data of a next frame used for recognition in the recognizing as a scanning angular resolution of the electromagnetic wave based on a size of a predetermined three-dimensional object determined in advance as a recognition target and a distance from the subject vehicle to the predetermined three-dimensional object; and taking a predetermined avoidance measure so that at least one of the scanning angular resolution and a number of detection points corresponding to the interval of detection points does not exceed a predetermined limit value.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, embodiments of the present invention will be described with reference to the drawings.

An external environment recognition apparatus according to an embodiment of the invention is applicable to a vehicle having a self-driving capability, that is, a self-driving vehicle. Note that a vehicle to which the external environment recognition apparatus according to the present embodiment is applied is referred to as a subject vehicle in some cases so as to be distinguished from other vehicles. The subject vehicle may be any of an engine vehicle including an internal combustion engine (engine) as a traveling drive source, an electric vehicle including a traveling motor as the traveling drive source, and a hybrid vehicle including an engine and a traveling motor as the traveling drive sources. The subject vehicle is capable of traveling not only in a self-drive mode that does not necessitate the driver's driving operation but also in a manual drive mode of the driver's driving operation.

While a self-driving vehicle is traveling in the self-drive mode (hereinafter, referred to as self-driving or autonomous driving), such a self-driving vehicle recognizes an external environment situation in the surroundings of the subject vehicle, based on detection data of an in-vehicle detector such as a camera or a light detection and ranging (LiDAR). The self-driving vehicle generates a traveling path (a target path) after a predetermined time from the current point in time, based on recognition results, and controls an actuator for traveling so that the subject vehicle travels along the target path.

Figure 1A:
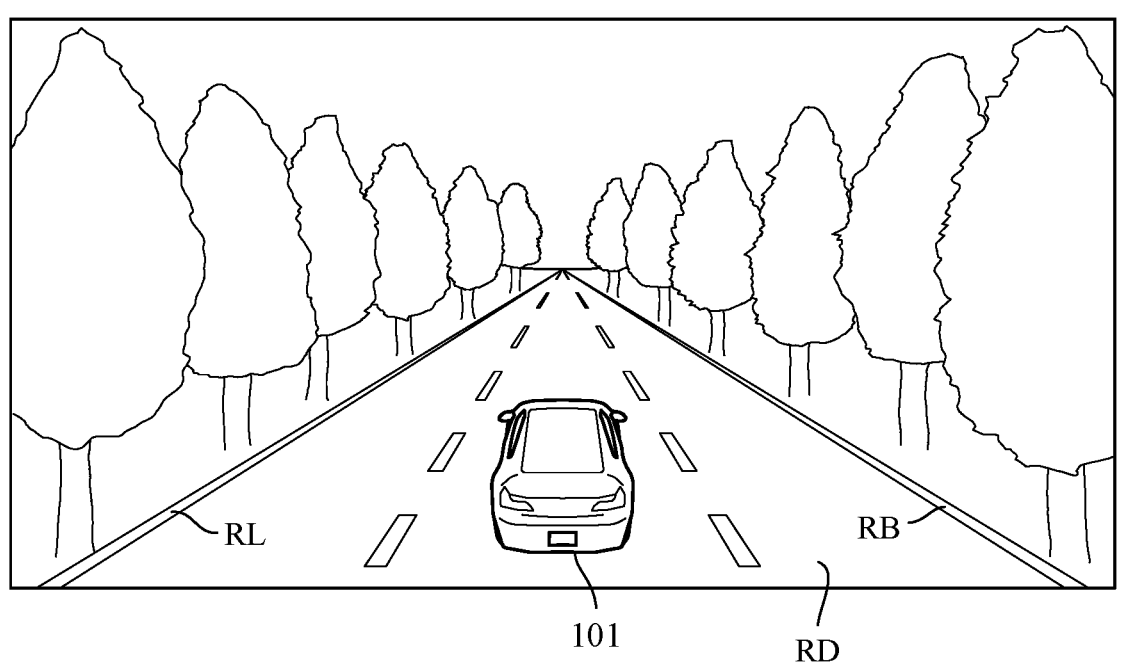
FIG. 1A is a diagram illustrating how a vehicle travels on a road.
Figure 1B:
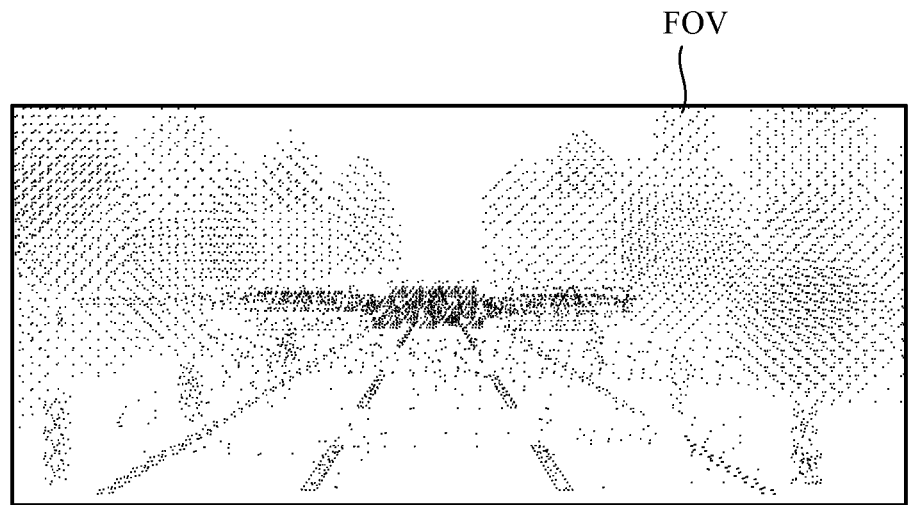
FIG. 1B is a schematic diagram illustrating an example of detection data obtained by a LiDAR.

FIG. 1A is a diagram illustrating how a subject vehicle 101, which is a self-driving vehicle, travels on a road RD. FIG. 1B is a schematic diagram illustrating an example of detection data obtained by a LiDAR mounted on the subject vehicle 101 and directed in an advancing direction of the subject vehicle 101. A measurement point (which can also be referred to as a detection point) by the LiDAR is point information of the irradiated laser that has been reflected by a certain one point on a surface of an object and then returned. The point information includes the distance from the laser source to the point, the intensity of the laser reflected and returned, and the relative velocity between the laser source and the point. In addition, data including a plurality of detection points as illustrated in FIG. 1B will be referred to as point cloud data. FIG. 1B illustrates point cloud data based on detection points of surfaces of objects included in the field of view (hereinafter, referred to as FOV) of the LiDAR among the objects in FIG. 1A.

The FOV may be, for example, 120 deg in a horizontal direction (which can be referred to as a road width direction) and 40 deg in a vertical direction (which can be referred to as an up-down direction) of the subject vehicle 101. The value of the FOV may be appropriately changed, based on the specifications of the external environment recognition apparatus. The subject vehicle 101 recognizes an external environment situation in the surroundings of the vehicle, more specifically, a road structure, an object, and the like in the surroundings of the vehicle, based on the point cloud data as illustrated in FIG. 1B, and generates a target path based on the recognition results.

As a method for sufficiently recognizing the external environment situation in the periphery of the vehicle, by the way, it is conceivable to increase the number of irradiation points of electromagnetic waves emitted from the in-vehicle detector such as a LiDAR (in other words, to increase irradiation point density of electromagnetic waves so as to increase the number of detection points constituting the point cloud data). Increasing the number of irradiation points of electromagnetic waves requires finer control of the angle at which the electromagnetic waves are irradiated (higher angular resolution). On the other hand, in a case where the number of irradiation points of electromagnetic waves is increased (the number of detection points is increased), there is a possibility that a processing load for controlling the in-vehicle detector increases, a capacity of the detection data (the point cloud data) obtained by the in-vehicle detector increases, and a processing load for the point cloud increases. In particular, in a situation where there are many objects on the road or beside the road, the capacity of the point cloud data further increases.

Hence, in consideration of the above points, in the embodiment, the external environment recognition apparatus is configured as described below.

<Overview>

The external environment recognition apparatus according to an embodiment intermittently irradiates irradiation light as an example of electromagnetic waves in the advancing direction of the subject vehicle 101 from the LiDAR of the subject vehicle 101, which travels on the road RD, and acquires point cloud data at different positions on the road RD in a discrete manner. The irradiation range of the irradiation light irradiated from the LiDAR is set such that a blank section of data is not generated in the advancing direction of the road RD in the point cloud data of a previous frame that has been acquired by the LiDAR by the previous irradiation and the point cloud data of a next frame to be acquired by the LiDAR by the current irradiation.

By setting the detection point density in the irradiation range, for example, to be higher on the road surface far from the subject vehicle 101 and to be lower on the road surface closer to the subject vehicle 101, the total number of detection points for use in the recognition processing is suppressed, as compared with a case where the high detection point density is set on all the road surfaces in the irradiation range. Thus, it becomes possible to reduce the number of the detection points for use in the recognition processing without lowering the recognition accuracy of the position (the distance from the subject vehicle 101) or the size of an object or the like to be recognized, based on the point cloud data.

Such an external environment recognition apparatus will be described in more detail.

<Configuration of Vehicle Control Device>

Figure 2:
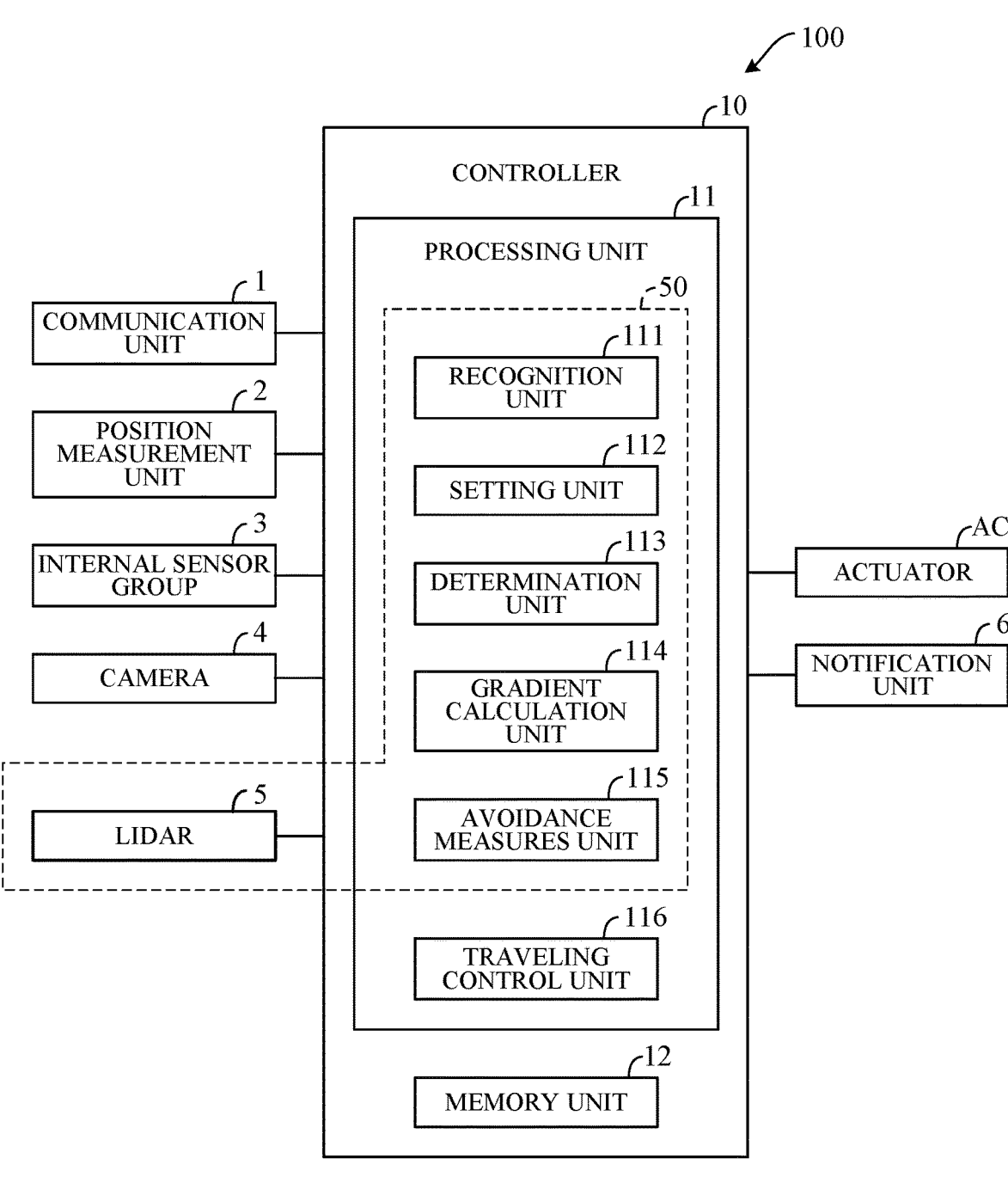
FIG. 2 is a block diagram illustrating a configuration of a main part of a vehicle control device.

FIG. 2 is a block diagram illustrating a configuration of a substantial part of a vehicle control device 100 including the external environment recognition apparatus. The vehicle control device 100 includes a controller 10, a communication unit 1, a position measurement unit 2, an internal sensor group 3, a camera 4, a LiDAR 5, and a traveling actuator AC. In addition, the vehicle control device 100 includes an external environment recognition apparatus 50, which constitutes a part of the vehicle control device 100. The external environment recognition apparatus 50 recognizes an external environment situation in the surroundings of the vehicle, based on detection data of an in-vehicle detector such as the camera 4 or the LiDAR 5.

The communication unit 1 communicates with various servers, not illustrated, through a network including a wireless communication network represented by the Internet network, a mobile telephone network, or the like, and acquires map information, traveling history information, traffic information, and the like from the servers regularly or at a given timing. The network includes not only a public wireless communication network but also a closed communication network provided for every predetermined management area, for example, a wireless LAN, Wi-Fi (registered trademark), Bluetooth (registered trademark), and the like. The acquired map information is output to a storage unit 12, and the map information is updated. The position measurement unit (GNSS unit) 2 includes a position measurement sensor for receiving a position measurement signal transmitted from a position measurement satellite. The position measurement satellite is an artificial satellite such as a GPS satellite or a quasi-zenith satellite. By using the position measurement information that has been received by the position measurement sensor, the position measurement unit 2 measures a current position (latitude, longitude, and altitude) of the subject vehicle 101.

The internal sensor group 3 is a general term of a plurality of sensors (internal sensors) for detecting a traveling state of the subject vehicle 101. For example, the internal sensor group 3 includes a vehicle speed sensor that detects the vehicle speed (the traveling speed) of the subject vehicle 101, an acceleration sensor that detects the acceleration in a front-rear direction and the acceleration in a left-right direction (a lateral acceleration) of the subject vehicle 101, a rotation speed sensor that detects the rotation speed of the traveling drive source, a yaw rate sensor that detects the rotation angular speed about the vertical axis at the center of gravity of the subject vehicle 101, and the like. The internal sensor group 3 also includes sensors that detect a driver's driving operation in the manual drive mode, for example, an operation on an accelerator pedal, an operation on a brake pedal, an operation on a steering wheel, and the like.

The camera 4 includes an imaging element such as a CCD or a CMOS, and captures an image of the surroundings of the subject vehicle 101 (a front side, a rear side, and lateral sides). The LiDAR 5 receives scattered light with respect to the irradiation light, and measures a distance from the subject vehicle 101 to an object in the surroundings, a position and a shape of the object, and the like. The notification unit 6 includes, for example, a display device, a sound reproduction device, or the like, and displays or reproduces a message or the like to the occupant of the subject vehicle 101.

The actuator AC is an actuator for traveling in order to control traveling of the subject vehicle 101. In a case where the traveling drive source is an engine, the actuator AC includes an actuator for throttle to adjust an opening (a throttle opening) of a throttle valve of the engine. In a case where the traveling drive source is a traveling motor, the traveling motor is included in the actuator AC. The actuator AC also includes an actuator for braking that actuates a braking device of the subject vehicle 101, and an actuator for steering that drives a steering device.

The controller 10 includes an electronic control unit (ECU). More specifically, the controller 10 is configured to include a computer including a processing unit 11 such as a CPU (microprocessor), the storage unit 12 such as ROM and RAM, and other peripheral circuits, not illustrated, such as an I/O interface. Note that a plurality of ECUs having different functions such as an ECU for engine control, an ECU for traveling motor control, and an ECU for braking device can be individually provided. However, in FIG. 2, the controller 10 is illustrated as an aggregation of these ECUs for the sake of convenience.

The storage unit 12 can store highly precise detailed map information (referred to as high-precision map information). The high-precision map information includes position information of roads, information of road shapes (curvatures or the like), information of road gradients, position information of intersections and branch points, information of the number of traffic lanes (traveling lanes), information of traffic lane widths and position information for every traffic lane (information of center positions of traffic lanes or boundary lines of traffic lane positions), position information of landmarks (traffic lights, traffic signs, buildings, and the like) as marks on a map, and information of road surface profiles such as irregularities of road surfaces. In addition, other than two-dimensional map information to be described below, the storage unit 12 can also store programs for various types of control, information of thresholds for use in programs, or the like, and setting information (irradiation point information to be described below, and the like) for the in-vehicle detector such as the LiDAR 5.

Note that highly precise detailed map information is not necessarily needed in an embodiment, and the detailed map information may not necessarily be stored in the storage unit 12.

The processing unit 11 includes a recognition unit 111, a setting unit 112, a determination unit 113, a gradient calculation unit 114, avoidance measures unit 115 and a traveling control unit 116, as functional configurations. Note that, as illustrated in FIG. 2, the recognition unit 111, the setting unit 112, the determination unit 113, the gradient calculation unit 114, and the avoidance measures unit 115 are included in the external environment recognition apparatus 50. As described above, the external environment recognition apparatus 50 recognizes an external environment situation in the periphery of the vehicle on the basis of the detection data of the in-vehicle detector such as the camera 4 or the LiDAR 5. Details of the recognition unit 111, the setting unit 112, the determination unit 113, the gradient calculation unit 114, and the avoidance measures unit 115 included in the external environment recognition apparatus 50 will be described below.

In the self-drive mode, the traveling control unit 116 generates a target path on the basis of the external environment situation in the periphery of the vehicle that has been recognized by the external environment recognition apparatus 50, and controls the actuator AC so that the subject vehicle 101 travels along the target path. Note that in the manual drive mode, the traveling control unit 116 controls the actuator AC in accordance with a traveling command (steering operation or the like) from the driver that has been acquired by the internal sensor group 3.

The LiDAR 5 will be further described.

<Detection Area>

The LiDAR 5 is attached to face the front side of the subject vehicle 101 so that the FOV includes an area to be observed during traveling. Since the LiDAR 5 receives the light irradiated with the irradiation light and scattered by a three-dimensional object or the like, the FOV of the LiDAR 5 corresponds to the irradiation range of the irradiation light and the detection area. That is, the irradiation point in the irradiation range corresponds to the detection point in the detection area.

In the embodiment, a road surface shape including irregularities, steps, undulations, or the like of a road surface, a three-dimensional object located on the road RD (equipment related to the road RD (a traffic light, a traffic sign, a groove, a wall, a fence, a guardrail, and the like)), an object on the road RD (including other vehicles and an obstacle on the road surface), and a division line provided on the road surface will be referred to as a three-dimensional object or the like. The division line includes a white line (including a line of a different color such as yellow), a curbstone line, a road stud, and the like, and may be referred to as a lane mark. In addition, a three-dimensional object or the like that has been set beforehand as a detection target will be referred to as a detection target.

<Example of Coordinate System>

Figure 3A:
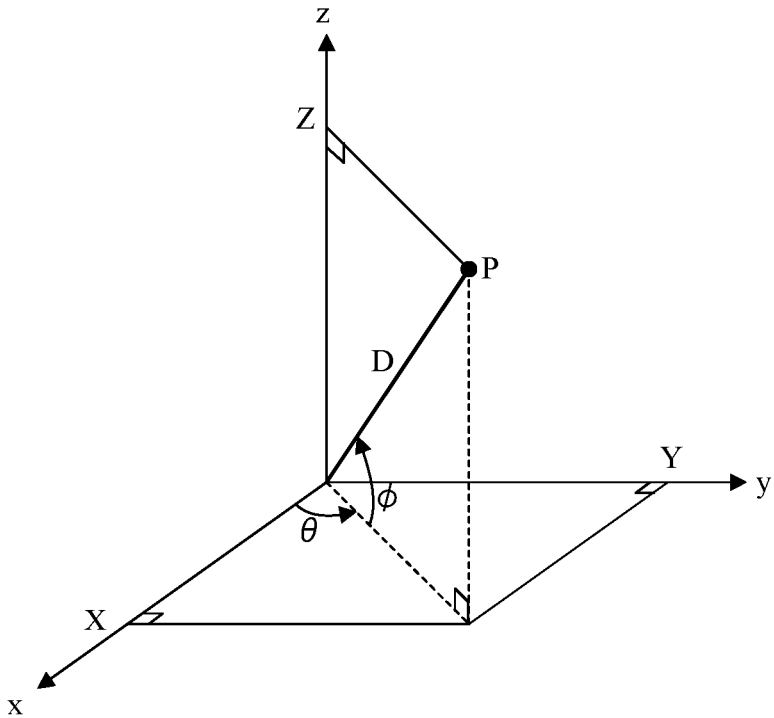
FIG. 3A is a diagram illustrating a position of point cloud data in a three-dimensional space using a three-dimensional coordinate system.

FIG. 3A is a diagram illustrating a position of point cloud data in a three-dimensional space using a three-dimensional coordinate system. In FIG. 3A, an x-axis plus direction corresponds to the advancing direction of the subject vehicle 101, a y-axis plus direction corresponds to a left side in a horizontal direction of the subject vehicle 101, and a z-axis plus direction corresponds to an upper side in a vertical direction.

In addition, an x-axis component of the position of data P will be referred to as a depth distance X, a y-axis component of the position of the data P will be referred to as a horizontal distance Y, and a z-axis component of the position of the data P will be referred to as a height Z.

Assuming that the distance measured by the LiDAR 5, in other words, the distance from the LiDAR 5 to a point on an object as a detection target is set to D, coordinates (X, Y, Z) indicating the position of the data P are calculated by the following formulas.

$$X = D \times \cos\theta \times \cos\varphi \quad (1)$$

$$Y = D \times \sin\theta \times \cos\varphi \quad (2)$$

$$Z = D \times \sin\varphi \quad (3)$$

Note that the angle θ will be referred to as a horizontal light projection angle, and the angle φ will be referred to as a vertical light projection angle. The horizontal light projection angle θ and the vertical light projection angle φ are set to the LiDAR 5 by the setting unit 112.

Figure 3B:
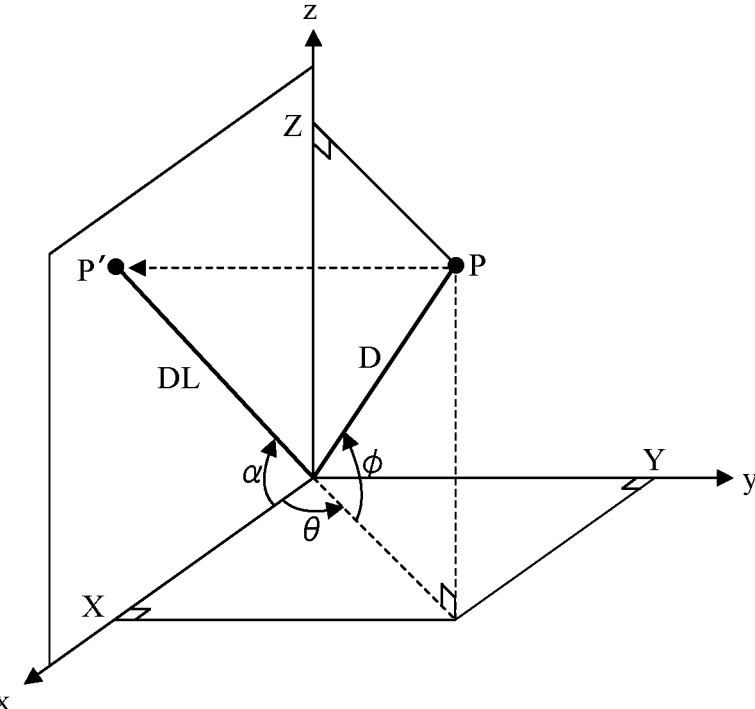
FIG. 3B is a diagram describing mapping of the point cloud data from the three-dimensional space to a two-dimensional X-Z space.

FIG. 3B is a diagram describing mapping of the point cloud data from the three-dimensional space to the two-dimensional X-Z space. In the embodiment, in order to calculate the road surface gradient of the road RD, mapping is performed from the data P in the three-dimensional space to data P' in the X-Z space for each data constituting the point cloud data. By this mapping, three-dimensional point cloud data is converted into two-dimensional point cloud data in the X-Z space. In the X-Z space, information indicating the horizontal distance Y is omitted, and information of the depth distance X and the height Z remains.

Figure 3C:
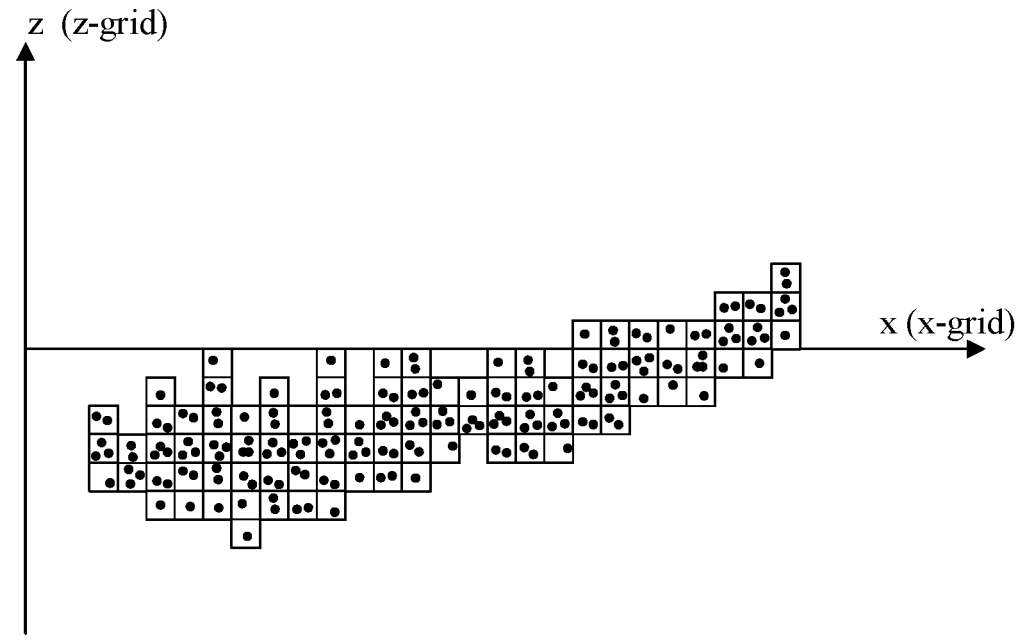
FIG. 3C is a schematic diagram illustrating the point cloud data divided for each grid.

Next, the X-Z space is divided by grids having a predetermined size (for example, 50 cm square), and the number of pieces of data P' included in each grid is counted. FIG. 3C is a schematic diagram illustrating the point cloud data divided for each grid. Note that the number of grids based on the actual data P' is much larger than the illustrated number.

Figure 3D:
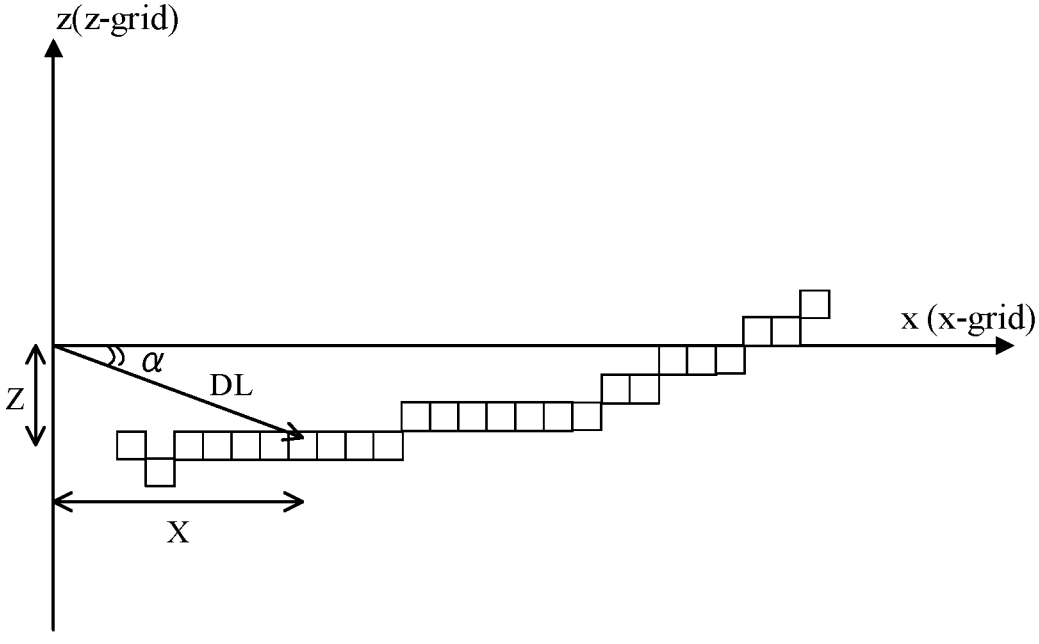
FIG. 3D is a schematic diagram illustrating a road surface gradient in depth distance direction.

FIG. 3C illustrates the position data (depth distance X) for each grid, the height Z for each grid, and the number of pieces of data P' included in each grid. In the embodiment, since the data of the three-dimensional object is separated and excluded in advance, the data is mainly grid data of X and Z with respect to the data of the road surface. Therefore, by sequentially extracting the grid in which the number of pieces of data P' in the grid is maximized in the depth distance X direction, a row of grids indicating the height Z of the road surface as illustrated in FIG. 3D, that is, the road surface gradient in the depth distance X direction can be obtained.

When attention is paid to each grid, Formula (4) described below is established between light projection angle α in the vertical direction with respect to the road surface point (corresponding to the irradiation point described above) of the grid, the depth distance X of the road surface point, and the height Z of the road surface. In addition, Formula (5) described below is established between a distance DL from the LiDAR 5 to the road surface point, the depth distance X of the road surface point, and the height Z of the road surface.

$$\tan\alpha = Z/X \quad (4)$$

$$DL = (X2 + Z2)1/2 \quad (5)$$

\<Light Projection Angle and Depth Distance\>

Figure 4A:
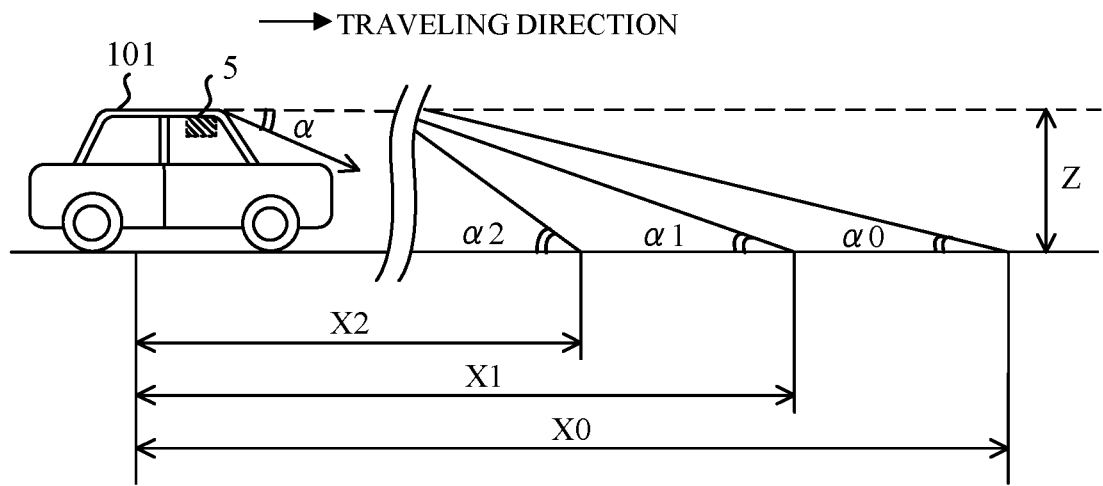
FIG. 4A is a schematic diagram illustrating a light projection angle and a depth distance.

FIG. 4A is a schematic diagram illustrating a light projection angle α in the vertical direction of the LiDAR 5 (an angle of irradiation light with respect to the horizontal direction) and the depth distance X. By changing the light projection angle α, the external environment recognition apparatus 50 changes the irradiation direction of the irradiation light upward and downward so as to move the position of the irradiation point in the vertical direction.

In FIG. 4A, in a case where the irradiation light is irradiated on the road RD at a location point where a depth distance X2 is 10 m, the road surface is irradiated at a projected angle α2. In addition, in a case where the irradiation light is irradiated on the road RD at a location point where a depth distance X1 is 40 m, the road surface is irradiated at a projected angle α1. Furthermore, in a case where the irradiation light is irradiated on the road RD at a location point where a depth distance X0 is 100 m, the road surface is irradiated at an incident angle α0.

In general, as the projected angle with respect to the road surface is smaller, the scattered light returning from the road surface to the LiDAR 5 becomes smaller. Therefore, in many cases, the reception level of the scattered light with respect to the irradiation light on the location point of the depth distance X0 is the lowest.

Figure 4B:
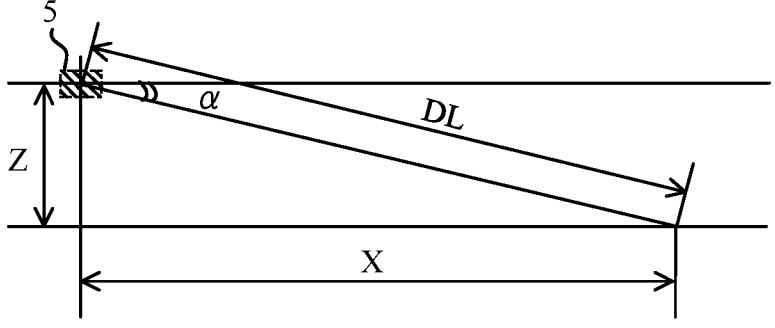
FIG. 4B is a schematic diagram illustrating a distance measured by the LiDAR.

FIG. 4B is a schematic diagram illustrating the distance DL measured by the LiDAR 5. As described above with reference to FIGS. 3A to 3D, the external environment recognition apparatus 50 calculates the depth distance X to the road surface point that has been irradiated with the irradiation light and the height Z of the road surface point, by using the light projection angle α set to the LiDAR 5, the distance DL (an optical path length of the irradiation light) measured by the LiDAR 5, and the formulas (4) and (5) described above.

The external environment recognition apparatus 50 decreases the light projection angle α, in a case where the depth distance is desired to be longer than a current value, and increases the light projection angle α, in a case where the depth distance is desired to be shorter than the current value. For example, in a case of changing the depth distance to 100 m from a state in which the irradiation light is irradiated on the location point where the depth distance is 70 m, the external environment recognition apparatus 50 makes the light projection angle α smaller than the current value so that the irradiation light is irradiated on the location point where the depth distance is 100 m. In addition, for example, in a case where the road RD is a downward gradient or the like and the road RD is not irradiated with the irradiation light, the external environment recognition apparatus 50 makes the light projection angle α larger than the current angle so that the road RD is irradiated with the irradiation light.

Figure 5A:
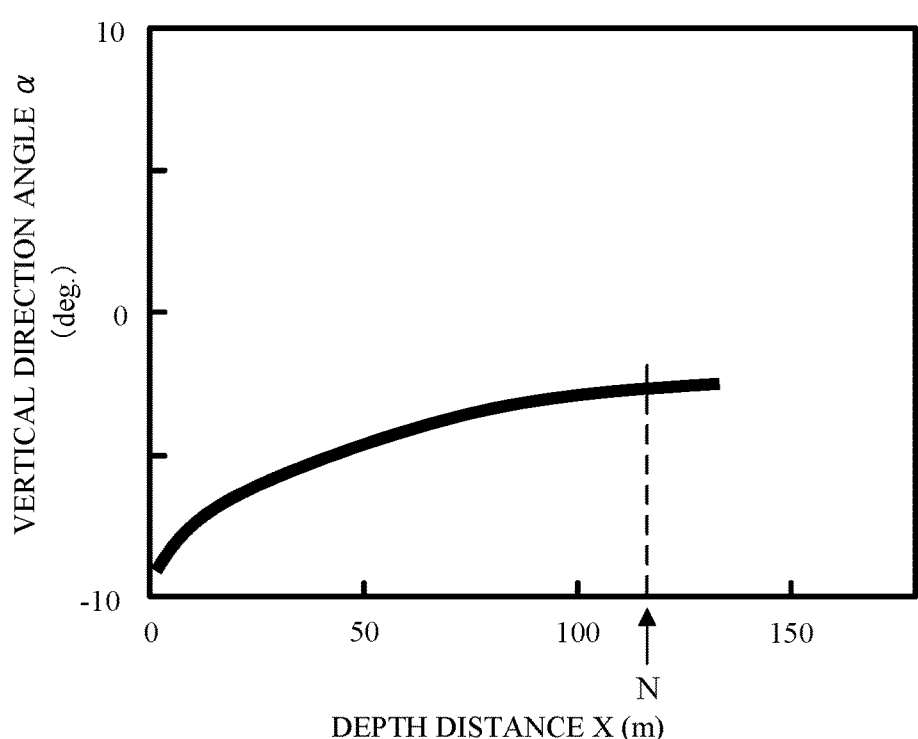
FIG. 5A is a schematic diagram illustrating an example of a relationship between the depth distance and the light projection angle in a vertical direction.

FIG. 5A is a schematic diagram illustrating an example of a relationship between the depth distance X and the light projection angle α in the vertical direction. The horizontal axis represents the depth distance X (unit: m), and the vertical axis represents the light projection angle α (unit: deg) in the vertical direction. The light projection angle α can be referred to as a vertical direction angle. As illustrated in FIG. 5A, the external environment recognition apparatus 50 increases the light projection angle α to a minus side, in the case where the depth distance X is desired to be shorter, and decreases the light projection angle α, in the case where the depth distance X is desired to be longer. Reference sign N will be described below.

<FOV and Depth Distance>

In an embodiment, the road surface situation from the depth distance (for example, X2 in FIG. 4A) corresponding to a lower end of the FOV of the LiDAR 5 to the depth distance (for example, X0 in FIG. 4A) corresponding to an upper end of the FOV is detected. The depth distance corresponding to the lower end of the FOV will be referred to as a first predetermined distance, and the depth distance corresponding to the upper end of the FOV will be referred to as a second predetermined distance.

In general, the camera 4 is superior to the LiDAR 5 in terms of resolution at short distances, and the LiDAR 5 is superior to the camera 4 in terms of distance measurement accuracy and relative speed measurement accuracy. Therefore, in a case where the angle of view of the camera 4 is wider in the vertical direction than the FOV of the LiDAR 5, the external environment recognition apparatus 50 may cause the camera 4 to detect the road surface situation for a lower side of the lower end of the FOV of the LiDAR 5 (in other words, a road surface closer to the subject vehicle 101 than the first predetermined distance).

<Number of Irradiation Points of Irradiation Light>

The external environment recognition apparatus 50 calculates the position of an irradiation point to be irradiated with the irradiation light of the LiDAR 5 in the FOV of the LiDAR 5. More specifically, the external environment recognition apparatus 50 calculates an irradiation point in accordance with an angular resolution to be calculated, based on a minimum size (for example, 15 cm in both vertical direction and horizontal direction) of the detection target that has been designated beforehand and the required depth distance (for example, 100 m). The required depth distance corresponds to a braking distance of the subject vehicle 101 that changes depending on the vehicle speed.

In an embodiment, a value obtained by adding a predetermined margin to the braking distance will be referred to as the required depth distance, based on the idea that the road surface situation of the road in the advancing direction of the subject vehicle 101, which is traveling, is to be detected for at least beyond the braking distance. The vehicle speed of the subject vehicle 101 is detected by the vehicle speed sensor of the internal sensor group 3. The relationship between the vehicle speed and the required depth distance is stored beforehand in the storage unit 12. Reference sign N in FIG. 5A indicates the required depth distance, when the vehicle speed is, for example, 100 km/h.

As an example of the angular resolution in a case where a detection target of 15 cm is detected at 100 m ahead as the required depth distance, 0.05 deg is needed in each the vertical direction and the horizontal direction, as will be described below with reference to FIG. 5B. Note that in a case where a detection target smaller than 15 cm is detected, and in a case where a detection target of 15 cm is detected at the depth distance X longer than 100 m, it is necessary to further increase the number of irradiation points in the FOV, by increasing the angular resolution.

For example, the external environment recognition apparatus 50 calculates the positions of the irradiation points so as to be arranged in a lattice pattern in the FOV, and causes the intervals of the lattice points in the vertical direction and the horizontal direction to respectively correspond to the angular resolutions in the vertical direction and the horizontal direction. In a case of increasing the angular resolution in the vertical direction, the FOV is divided in the vertical direction by the number based on the angular resolution, and the lattice interval in the vertical direction is narrowed to increase the number of irradiation points. In other words, the interval of the irradiation points is made dense. On the other hand, in a case of reducing the angular resolution in the vertical direction, the FOV is divided in the vertical direction by the number based on the angular resolution, and the lattice interval in the vertical direction is widened to reduce the number of irradiation points. In other words, the interval of the irradiation points is made sparse. The same applies to the horizontal direction.

The external environment recognition apparatus 50 generates information (hereinafter, referred to as irradiation point information) indicating the position of the irradiation point that has been calculated in accordance with the angular resolution, and stores, in the storage unit 12, the information in association with the position information indicating the current traveling position of the subject vehicle 101.

<Angular Resolution and Depth Distance>

Figure 5B:
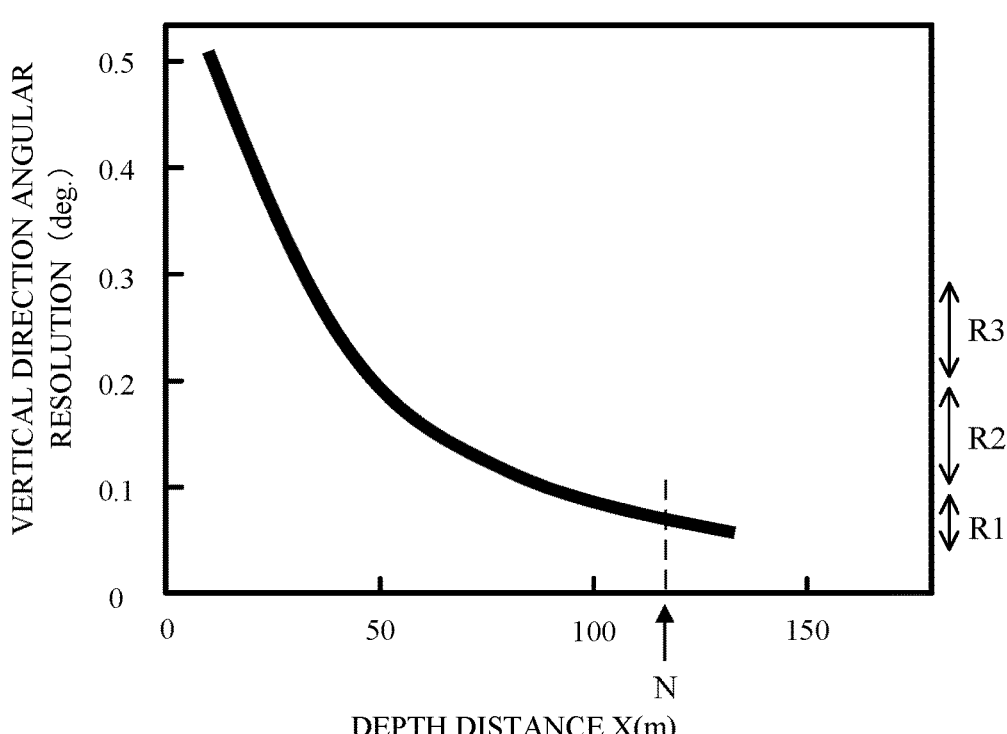
FIG. 5B is a schematic diagram illustrating an example of a relationship between the depth distance and an angular resolution in the vertical direction.

FIG. 5B is a schematic diagram illustrating an example of the relationship between the depth distance X and the angular resolution in the vertical direction, and illustrates the angular resolution (can also referred to as required angular resolution) required for recognizing the detection target having the above-described size (15 cm both vertically and horizontally). The horizontal axis represents the depth distance X (unit: m), and the vertical axis represents the angular resolution (unit: deg) in the vertical direction. In general, as the depth distance X decreases (in other words, the detection target is closer to the subject vehicle 101), the angle of view with respect to the detection target increases. Therefore, it is possible to detect the detection target, even when the angular resolution is low. On the other hand, as the depth distance X increases (in other words, the detection target is far from the subject vehicle 101), the angle of view with respect to the detection target decreases. Therefore, a high angular resolution is required for detecting the detection target. For this reason, as illustrated in FIG. 5B, the external environment recognition apparatus 50 decreases the angular resolution (increases the value of the angular resolution), as the depth distance X is shorter, and increases the angular resolution (decreases the value of the angular resolution), as the depth distance X is longer.

Note that although not illustrated, the same applies to the relationship between the depth distance X and the angular resolution in the horizontal direction.

Reference sign N in FIG. 5B indicates the required depth distance, when the vehicle speed is, for example, 100 km/h.

While the subject vehicle 101 is traveling in the self-drive mode, the external environment recognition apparatus 50 sets a predetermined irradiation point (a detection point) in the FOV, and also controls the LiDAR 5 to irradiate irradiation light. Thus, the irradiation light from the LiDAR 5 is irradiated toward the irradiation point (the detection point) that has been set.

Note that the irradiation light of the LiDAR 5 may be irradiated in a raster scanning method on all irradiation points (detection points) arranged in a lattice pattern in the FOV, or the irradiation light may be intermittently irradiated so that the irradiation light is irradiated only on a predetermined irradiation point (a detection point), or may be irradiated in any other mode.

Figure 6A:
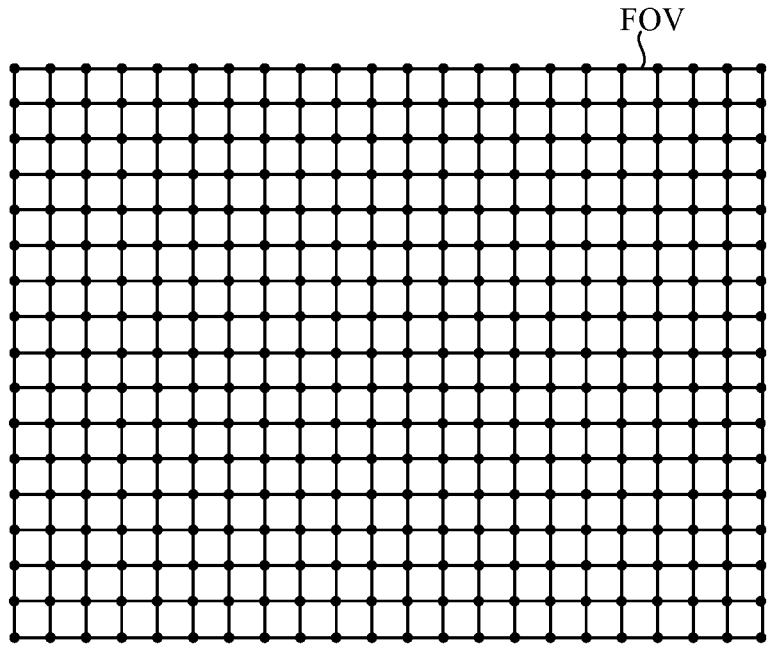
FIG. 6A is a schematic diagram illustrating an example of an irradiation point when the irradiation light of the LiDAR is emitted in a raster scanning method.

FIG. 6A is a schematic diagram illustrating an example of irradiation points, in a case where the irradiation light of the LiDAR 5 is irradiated in the raster scanning method. When irradiating the irradiation light from the LiDAR 5, the external environment recognition apparatus 50 sets the angular resolution required at the required depth distance N for the entire area in the FOV, and controls the irradiation direction of the irradiation light.

For example, in a case where the required angular resolution for recognizing the detection target present at a location point of the required depth distance N on the road RD is 0.05 deg both vertically (in a vertical direction) and horizontally (in a horizontal direction), the external environment recognition apparatus 50 controls the irradiation direction of the irradiation light to be shifted at an interval of 0.05 deg vertically and horizontally in the entire area of the FOV. That is, in FIG. 6A, each black circle of the lattice point corresponds to the irradiation point (the detection point), and the vertical and horizontal intervals of the irradiation points (the detection points) correspond to an angular resolution of 0.05 deg.

The number of actual irradiation points in the FOV is much larger than the number of black circles illustrated in FIG. 6A. As a specific example, in a case where the FOV of the LiDAR 5 is 120 deg in the horizontal direction, 2400 black circles corresponding to the irradiation points (the detection points) are arranged at an interval of 0.05 deg in the horizontal direction. Similarly, in a case where the FOV is 40 deg in the vertical direction, 800 black circles corresponding to the irradiation points (the detection points) are arranged at an interval of 0.05 deg in the vertical direction.

The external environment recognition apparatus 50 acquires detection data of the detection points corresponding to the irradiation points in FIG. 6A, whenever the irradiation light for one frame is scanned on the FOV, and extracts data of the detection points based on the angular resolution required for the recognition of the detection target from these pieces of detection data. More specifically, for an area in the FOV in which the depth distance X is shorter than the required depth distance N and the required angular resolution of 0.1 deg is sufficient, instead of 0.05 deg, data is extracted so that the vertical and horizontal data intervals are wider than the interval of 0.05 deg. In addition, also for an area in the FOV corresponding to the sky, the road RD is not present, and thus data is extracted so as to widen the vertical and horizontal data intervals. The interval of the detection points that have been extracted in this manner is similar to the interval of the detection points indicated by black circles in FIG. 6B to be described below.

The external environment recognition apparatus 50 extracts the data of the detection points, thereby enabling the total number of pieces of detection data for use in the recognition processing to be suppressed.

Figure 6B:
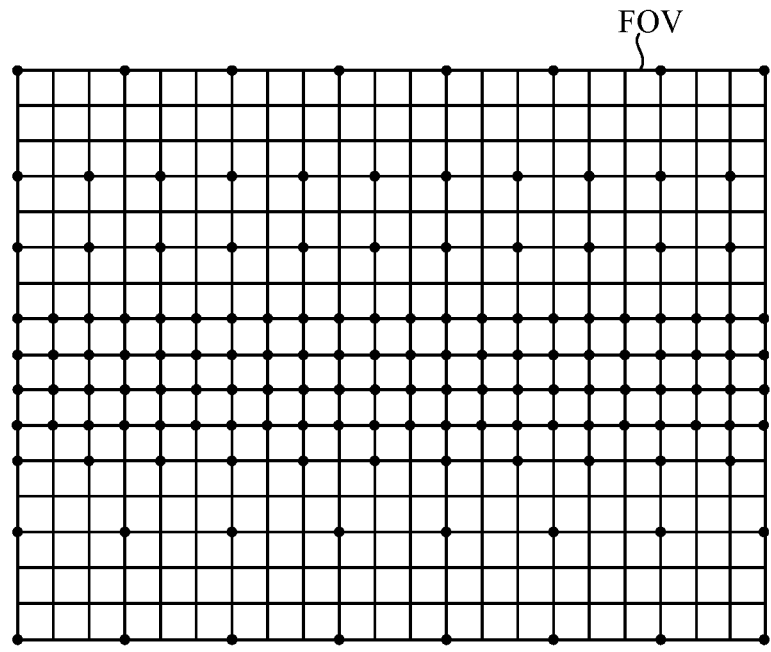
FIG. 6B is a schematic diagram illustrating an example of irradiation points in a case where the irradiation light of the LiDAR 5 is emitted only to predetermined lattice points arranged in a lattice pattern in a detection area.

FIG. 6B is a schematic diagram illustrating an example of irradiation points, in a case where the irradiation light of the LiDAR 5 is irradiated only on predetermined irradiation points (the detection points) arranged in a lattice pattern in the FOV. When irradiating the irradiation light from the LiDAR 5, the external environment recognition apparatus 50 sets the interval of irradiation points (the detection points) in the FOV to an interval corresponding to the required angular resolution, and controls the irradiation direction of the irradiation light.

For example, in a case where the required angular resolution for recognizing the detection target present at a location point of the required depth distance N on the road RD is 0.05 deg both vertically (in the vertical direction) and horizontally (in the horizontal direction), the external environment recognition apparatus 50 controls the irradiation direction of the irradiation light to be shifted at an interval of 0.05 deg vertically and horizontally in the area corresponding to the required depth distance N (a band-shaped area that is long in the left-right direction).

In addition, for an area in the FOV in which the depth distance X is shorter than the required depth distance N and the required angular resolution of 0.1 deg is sufficient, the irradiation direction of the irradiation light is controlled to widen the vertical and horizontal intervals of the detection points. Furthermore, also for an area in the FOV corresponding to the sky, the road RD is not present, and thus the irradiation direction of the irradiation light is controlled to widen the vertical and horizontal intervals of the detection points.

The external environment recognition apparatus 50 controls the interval of the detection points, thereby enabling the total number of pieces of detection data for use in the recognition processing to be suppressed.

Note that the number of actual irradiation points in the FOV is much larger than the number of black circles illustrated in FIG. 6B.

Figure 7:
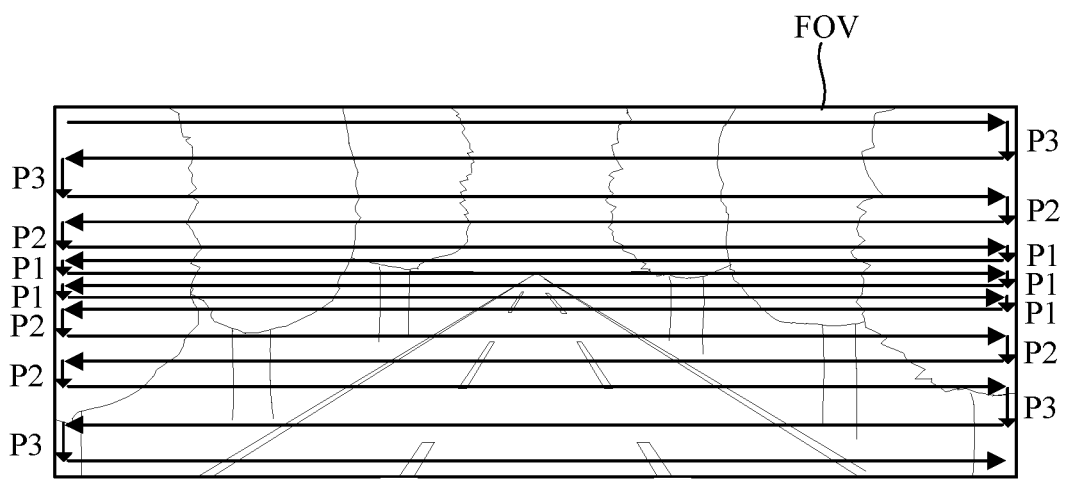
FIG. 7 is a diagram illustrating an example of an irradiation order in a case where the irradiation points illustrated in FIG. 6B are irradiated with the irradiation light.

FIG. 7 is a diagram illustrating an example of an irradiation order, in a case where the irradiation points illustrated in FIG. 6B are irradiated with the irradiation light. In FIG. 7, the irradiation directions of the irradiation light are respectively controlled in directions of arrows from upper left irradiation points to lower right irradiation points of the FOV. In addition, characters P1 to P3 written together with vertical arrows indicate the magnitude of the intervals of the irradiation points (the detection points), and P1 indicates, for example, an interval of the irradiation points (the detection points) corresponding to an angular resolution of 0.05 deg. P2 indicates, for example, an interval of the irradiation points (the detection points) corresponding to an angular resolution of 0.1 deg. P3 indicates, for example, an interval of the irradiation points (the detection points) corresponding to an angular resolution of 0.2 deg.

FIG. 7 illustrates an example in which the angular resolution is switched in three stages. However, without being limited to the three stages, and the angular resolution may be configured to be appropriately switched in two or more stages.

<Configuration of External Environment Recognition Apparatus>

Details of the external environment recognition apparatus 50 will be described.

As described above, the external environment recognition apparatus 50 includes the recognition unit 111, the setting unit 112, the determination unit 113, the gradient calculation unit 114, the avoidance measures unit 115, and the LiDAR 5.

<Recognition Unit>

The recognition unit 111 generates three-dimensional point cloud data using time-series detection data detected in the FOV of the LiDAR 5.

In addition, the recognition unit 111 recognizes a road structure in the traveling direction of the road RD on which the subject vehicle 101 travels, and a detection target on the road RD in the traveling direction on the basis of the detection data that has been measured by the LiDAR 5. The road structure refers to, for example, a straight road, a curved road, a branch road, an entrance and exit of a tunnel, and the like.

Further, for example, by performing luminance filtering processing or the like on data indicating a flat road surface, the recognition unit 111 senses a division line. In this case, in a case where the height of the road surface on which the luminance exceeds a predetermined threshold is substantially the same as the height of the road surface on which the luminance does not exceed the predetermined threshold, the recognition unit 111 may determine that it is a division line.

<Recognition of Road Structure>

An example of recognition of the road structure by the recognition unit 111 will be described. The recognition unit 111 recognizes, as boundary lines RL and RB of the road RD (FIG. 1A), a curbstone, a wall, a groove, a guardrail, or a division line on the road RD on a forward side, which is the advancing direction, included in the point cloud data that has been generated, and recognizes a road structure in the advancing direction indicated by the boundary lines RL and RB. As described above, the division line includes a white line (including a line in a different color), a curbstone line, a road stud, or the like, and a traveling lane of the road RD is defined by markings with these division lines. In an embodiment, the boundary lines RL and RB on the road RD defined by the above markings will be referred to as division lines.

The recognition unit 111 recognizes an area interposed between the boundary lines RL and RB, as an area corresponding to the road RD. Note that the recognition method for recognizing the road RD is not limited to this, and the road RD may be recognized in another method.

In addition, the recognition unit 111 separates the generated point cloud data into point cloud data indicating a flat road surface and point cloud data indicating a three-dimensional object or the like. For example, among three-dimensional objects or the like on the road in the advancing direction included in the point cloud data, road surface shapes such as irregularities, steps, and undulations that exceed 15 cm in size and objects that exceed 15 cm in length and width are recognized as detection targets. An example of the size of the detection target is 15 cm, and the size may be appropriately changed.

<Setting Unit>

The setting unit 112 sets the vertical light projection angle $\varphi$ of the irradiation light to the LiDAR 5. In a case where the FOV of the LiDAR 5 is 40 deg in the vertical direction, the vertical light projection angle $\varphi$ is set in a range of 0 to 40 deg at an interval of 0.05 deg. Similarly, the setting unit 112 sets the horizontal light projection angle $\theta$ of the irradiation light to the LiDAR 5. In a case where the FOV of the LiDAR 5 is 120 deg in the horizontal direction, the horizontal light projection angle $\theta$ is set in a range of 0 to 120 deg at an interval of 0.05 deg.

The setting unit 112 sets the number of irradiation points (corresponding to the number of black circles in FIGS. 6A and 6B and indicating the irradiation point density) in the FOV to the LiDAR 5, based on the angular resolution determined by the determination unit 113 as will be described below. As described above, the intervals in the vertical direction and the horizontal direction of the irradiation points (the detection points) arranged in a lattice pattern in the FOV are respectively caused to correspond to the angular resolutions in the vertical direction and the horizontal direction.

<Determination Unit>

The determination unit 113 determines a scanning angular resolution set by the setting unit 112. First, the determination unit 113 calculates each the light projection angle $\alpha$ in the vertical direction at each depth distance X and the distance DL to the road surface point at each depth distance X. Specifically, as described with reference to FIG. 3D, the depth distance X is calculated, based on the distance DL to the road surface point measured by the LiDAR 5 and the light projection angle $\alpha$ set in the LiDAR 5 at the time of measurement. The determination unit 113 calculates a relationship between the calculated depth distance X and the vertical direction angle (FIG. 5A). In addition, the determination unit 113 calculates a relationship between the depth distance X and the distance DL. Furthermore, as illustrated in FIG. 5B, the determination unit 113 calculates a relationship between the depth distance X and the vertical direction angular resolution, based on the size of the detection target and the depth distance X. In this manner, the vertical direction angular resolution is calculated, based on the size of the detection target and the distance DL, and the relationship between the depth distance X and the vertical direction angular resolution is calculated, based on the distance DL and the depth distance X.

Next, the determination unit 113 determines the angular resolution in the vertical direction required for recognizing the detection target of the above-described size. For example, for the depth distance X at which the angular resolution in the vertical direction is smaller than 0.1 deg in FIG. 5B, 0.05 deg, which is smaller than 0.1 deg, is determined as the required angular resolution. In addition, for the depth distance X at which the angular resolution in the vertical direction is equal to or larger than 0.1 deg and smaller than 0.2 deg, 0.1 deg, which is smaller than 0.2 deg, is determined as the required angular resolution. Hereinafter, in a similar manner, for the depth distance X at which the angular resolution in the vertical direction is equal to or larger than 0.2 deg and smaller than 0.3 deg and the depth distance X at which the angular resolution in the vertical direction is equal to or larger than 0.3 deg and smaller than 0.4 deg, 0.2 deg and 0.3 deg, which are smaller, are respectively determined as the required angular resolutions. R1 corresponds to P1 in FIG. 7. R2 corresponds to P2 in FIG. 7. R3 corresponds to P3 in FIG. 7.

The determined required angular resolution in the vertical direction can be reflected as an interval in the vertical direction of the detection points when the three-dimensional point cloud data of a next frame is acquired.

In addition, the determination unit 113 may determine the required angular resolution in the horizontal direction for recognizing the detection target in accordance with the size of the detection target and the depth distance X. The required angular resolution in the horizontal direction can also be reflected as an interval in the horizontal direction of the detection points when the three-dimensional point cloud data of a next frame is acquired.

Note that the required angular resolution in the horizontal direction may be matched with the required angular resolution in the vertical direction that has been determined previously. In other words, on the same horizontal line with the detection point at which the required angular resolution in the vertical direction has been determined to be 0.05 deg, the required angular resolution in the horizontal direction is determined to be 0.05 deg. Similarly, on the same horizontal line with the detection point at which the required angular resolution in the vertical direction has been determined to be 0.1 deg, the required angular resolution in the horizontal direction is determined to be 0.1 deg. Furthermore, for other required angular resolutions, on the same horizontal line with the detection point at which the required angular resolution in the vertical direction has been determined, the required angular resolution in the horizontal direction is determined to be the same value with the required angular resolution in the vertical direction.

In the following three cases, the determination unit 113 is configured to be capable of enlarging an area in the FOV in which the irradiation point density is set to be high (in other words, the distance width in the depth direction (which can also be referred to as a depth distance width) for setting a high angular resolution to the LiDAR 5).

(1) Case where the required depth distance N is extended together with an increase of the vehicle speed (2) Case where the farthest depth distance X, which is detectable by the LiDAR 5, is shorter than the required depth distance N (3) Case where the road surface on a forward side is an upper gradient In the above cases (1) and (3), the depth distance width for setting the required angular resolution to be higher is enlarged so that a farther detection target can be recognized. In addition, in the above case (2), the required angular resolution is set to be higher, based on an idea of irradiating an undetected range more finely for safety.

Note that the above cases (1) to (3) will be referred to as enlargement requirements for enlarging an area in which the irradiation point density is set to be high, and details will be described later with reference to FIG. 9B.

<Gradient Calculation Unit>

In a case where the traveling direction of the road RD on which the subject vehicle 101 travels is a downhill and the reflection angle from the road surface is small, or in a situation where the vehicle speed is fast and the required depth distance N increases, the LiDAR 5 may not be able to receive the scattered light up to the required depth distance N. In this case, the farthest depth distance X that can be detected by the LiDAR 5 is referred to as a maximum depth distance L. The maximum depth distance may be referred to as a maximum road surface detection distance.

When the required depth distance N calculated from the vehicle speed of the subject vehicle 101 exceeds the maximum depth distance L (for example, when the required depth distance N is 108 m, the maximum depth distance L=92 m), the gradient calculation unit 114 predicts the height Z (gradient) of the road surface from the maximum depth distance L to the required depth distance N using the measurement data of the height Z (gradient) of the road surface from the lower end of the FOV (first predetermined distance) to the maximum depth distance L practically acquired on the basis of the detection data of the LiDAR 5. For the prediction of the gradient, for example, an AR model or an ARIMA model that is a time series prediction method can be used.

Figure 8:
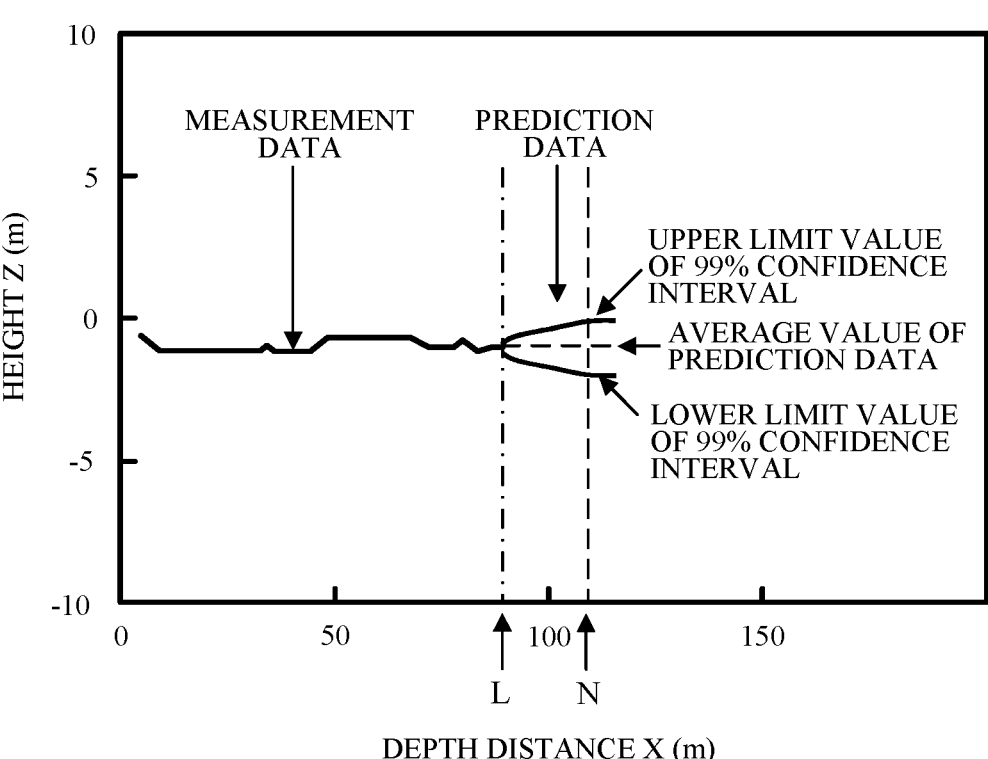
FIG. 8 is a diagram illustrating an example of a result of prediction of the road surface gradient.

FIG. 8 illustrates an example of a result of prediction using an ARIMA model. The horizontal axis indicates the depth distance X (unit: m), and the vertical axis indicates the height Z (unit: m) of the road surface. As the prediction result, an average value of the predicted height Z, upper and lower limit values (for example, upper and lower limit values of a 99% confidence interval) of the predicted height Z, and the like are obtained. In the embodiment, a prediction value corresponding to the curve of the upper limit value of 99% confidence interval in the direction in which the area of high angular resolution in the vertical direction is further expanded is adopted as the "upper limit value of the predicted height". With this configuration, in a case where the road RD in the FOV is an uphill, by setting the angular resolution in the vertical direction to be high in the area on the upper side in the vertical direction, it is possible to reduce the possibility of missing data when acquiring the three-dimensional point cloud data of a next frame. On the other hand, in a case where the road RD is a downhill, since the road surface is not irradiated with the irradiation light from the LiDAR 5 in the first place, the area may not be expanded to the lower side in the vertical direction. Therefore, in order to avoid unnecessary processing, the prediction value corresponding to the curve of the lower limit value of 99% confidence interval is not adopted.

As described above, the gradient calculation unit 114 predicts the data of the road surface gradient from the maximum depth distance L to the required depth distance N using the "upper limit value of the predicted height" by an ARIMA model or the like.

<Avoidance Measures Unit>

For example, the determination unit 113 determines an increase of the number of irradiation points to be set in the FOV (to enlarge the depth distance width for setting a high angular resolution to the LiDAR 5). Thus, in a case where the required angular resolutions in the vertical direction and the horizontal direction exceed the angular resolution that can be set to the LiDAR 5, in a case where the required angular resolutions exceed the number of irradiation points that can be irradiated in one frame period by the LiDAR 5, or in a case where the required angular resolutions exceed the number of points that can be arithmetically operated in one frame period by the processing unit 11, the avoidance measures unit 115 takes predetermined measures to avoid the setting that exceeds the specifications of the LiDAR 5 (a setting limit that enables irradiation) or the specifications of the processing unit 11 (a setting limit that enables an arithmetic operation).

As an example, the avoidance measures unit 115 causes the traveling control unit 116 to limit the vehicle speed, while traveling in the self-drive mode. In the limitation of the vehicle speed, an upper limit of the vehicle speed is set in order to keep the extension of the required depth distance N within a predetermined range, or an increase of the vehicle speed is prohibited in order to maintain the current required depth distance N. In addition, the vehicle speed limit for avoiding the setting that exceeds the setting limit of the LiDAR 5 or the processing unit 11 is notified to the occupant by a warning display, a warning sound, or the like via the notification unit 6.

In addition, as another example, the avoidance measures unit 115 may notify the occupant of the vehicle speed necessary for avoiding the setting that exceeds the setting limit of the LiDAR 5 or the processing unit 11 via the notification unit 6, before causing the traveling control unit 116 to limit the vehicle speed. By prompting the occupant to perform a deceleration operation such as a brake operation, it becomes possible to avoid the setting that exceeds the setting limit of the LiDAR 5 or the processing unit 11.

Furthermore, as another example, the avoidance measures unit 115 may set the frame rate at which the LiDAR 5 acquires the three-dimensional point cloud data to be lower than the current one, and thus the limit value that may be set to the LiDAR 5 or the processing unit 11 may be gentle in appetence. For example, by setting the frame rate to 1/2 the current one, the angular resolution that can be set to the LiDAR 5 is doubled (in other words, the number of irradiation points that can be set to the LiDAR 5 is doubled from the current number). Before changing the frame rate for the LiDAR 5, the avoidance measures unit 115 may notify the occupant via the notification unit 6 that the setting is to be changed in order to avoid the setting that exceeds the setting limit of the LiDAR 5 or the processing unit 11.

Furthermore, as another example, the avoidance measures unit 115 causes the traveling control unit 116 to reduce a self-drive level of the self-drive mode to a level lower than the current level at the time of traveling in the self-drive mode, instead of not making the setting that exceeds the setting limit of the LiDAR 5 or the processing unit 11 (maintaining the current setting). Before changing the self-drive level in the self-drive mode, the avoidance measures unit 115 may notify the occupant via the notification unit 6 that the self-drive level is to be changed in order to avoid the setting that exceeds the setting limit of the LiDAR 5 or the processing unit 11.

<Generation of Position Data>

The external environment recognition apparatus 50 is capable mapping data indicating the position of the detection target that has been detected, based on time-series point cloud data measured in real time by the LiDAR 5 on, for example, an X-Y two-dimensional map and generating continuous position data. In an X-Y space, information indicating the height Z is omitted, and information of the depth distance X and the horizontal distance Y remains.

The recognition unit 111 acquires the position information of a three-dimensional object or the like on the two-dimensional map stored in the storage unit 12, and calculates a relative position of the three-dimensional object or the like through coordinate conversion with the position of the subject vehicle 101 as the center, from the moving speed and the moving direction (for example, an azimuth angle) of the subject vehicle 101. Whenever the point cloud data is acquired by the LiDAR 5 by measurement, the recognition unit 111 converts the coordinates of the relative position of the three-dimensional object or the like based on the acquired point cloud data with the position of the subject vehicle 101 as the center, and records the converted position on the two-dimensional map.

<Description of Flowchart>

Figure 9A:
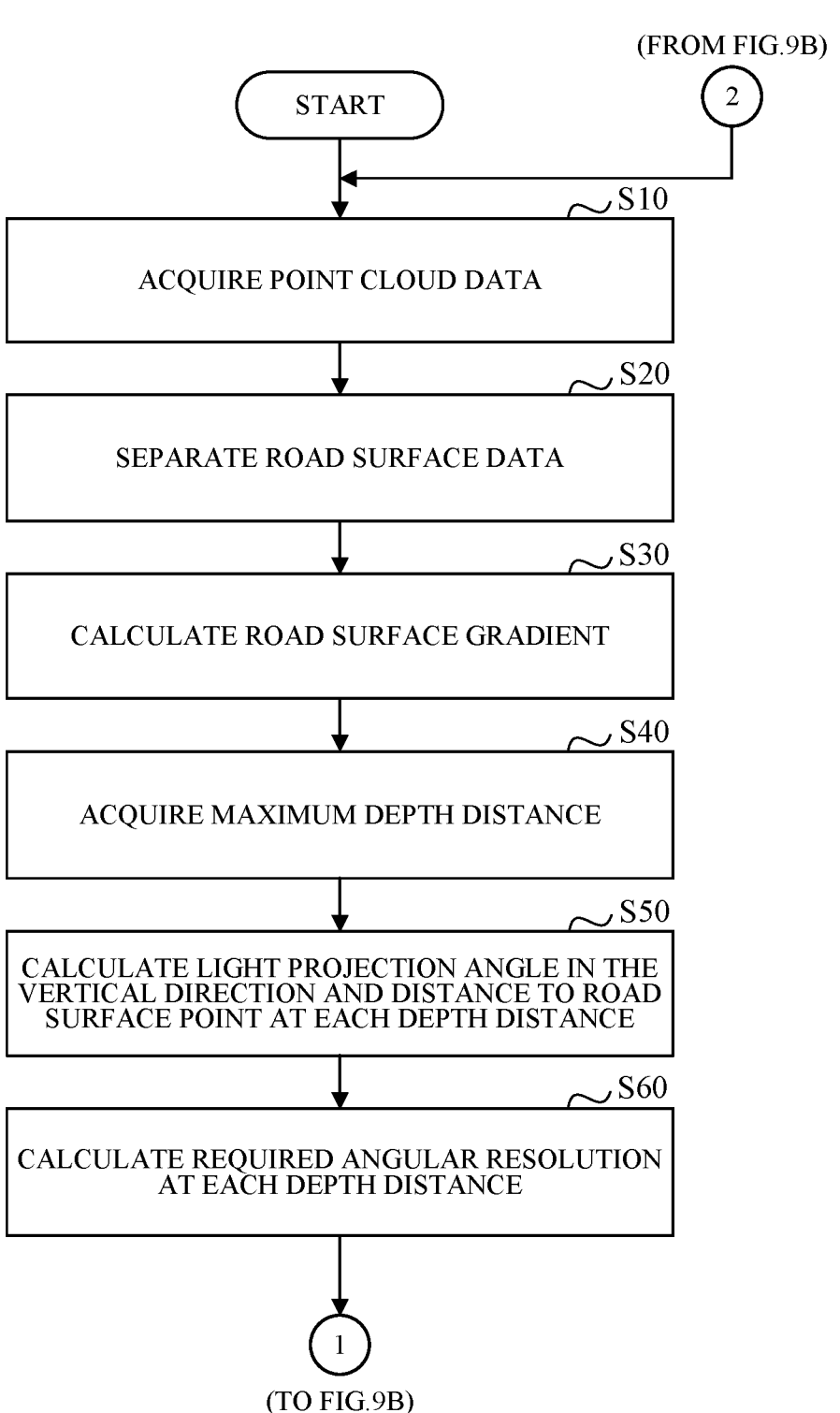
FIG. 9A is a flowchart illustrating an example of processing executed by a CPU of the controller in FIG. 2.
Figure 9B:
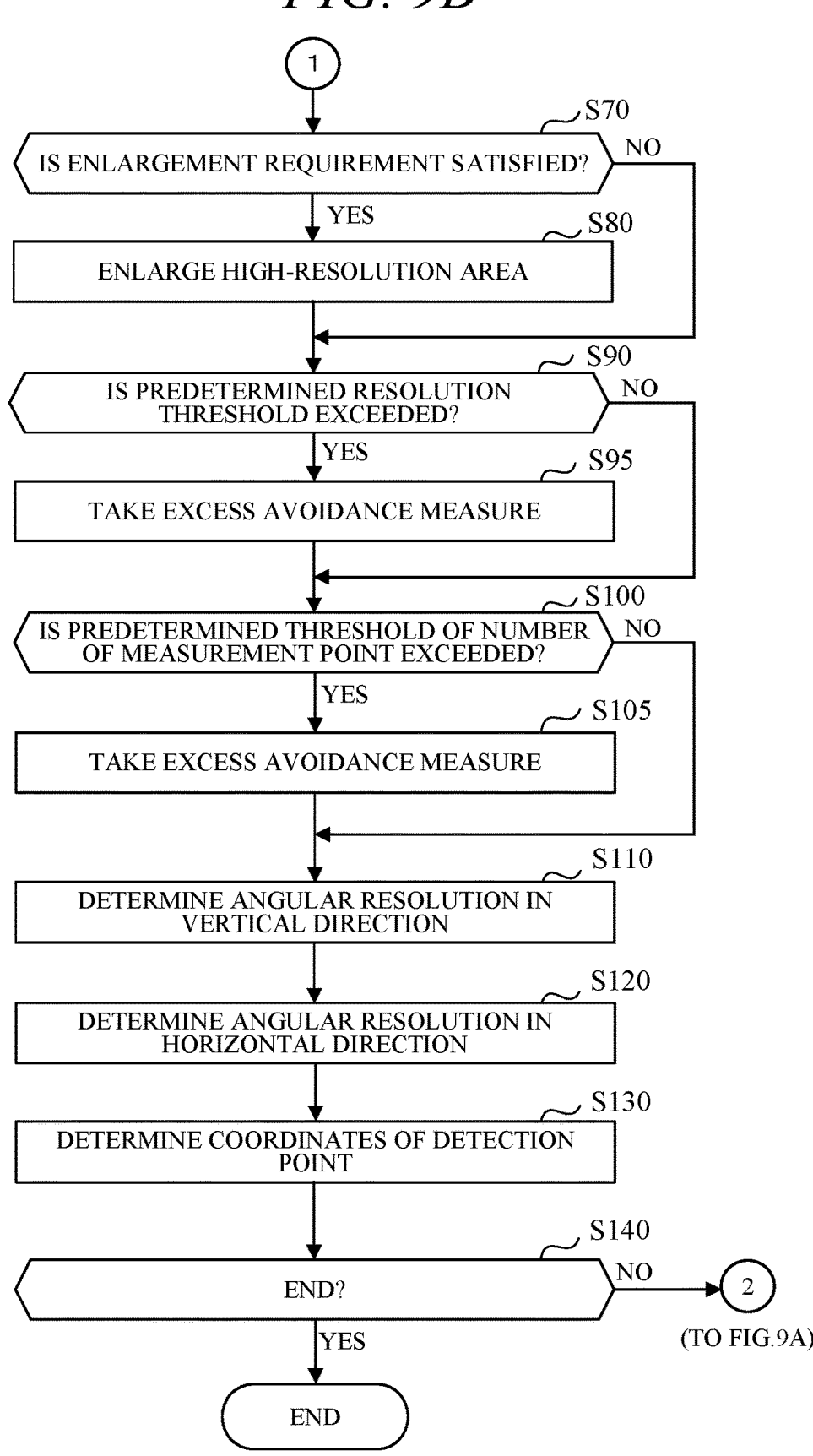
FIG. 9B is a flowchart illustrating an example of processing executed by a CPU of the controller in FIG. 2.

FIGS. 9A and 9B is a flowchart illustrating an example of processing executed by the processing unit 11 of the controller 10 in FIG. 2 in accordance with a predetermined program. The processing unit 11 executes the processing repeatedly, for example, every predetermined cycle while the subject vehicle 101 is traveling in the self-drive mode. First, in step S10, the processing unit 11 causes the LiDAR 5 to acquire three-dimensional point cloud data, and proceeds to step S20.

In step S20, the processing unit 11 performs separation processing of data of the road surface on the point cloud data, and proceeds to step S30. More specifically, data of the three-dimensional object or the like on the road RD is detected and separated from the point cloud data, and point cloud data indicating a flat road surface and point cloud data indicating the three-dimensional object or the like are obtained. The three-dimensional object or the like includes, for example, an obstacle on a road, a curbstone, a wall, a groove, a guardrail, and the like provided at the left and right ends of the road RD, and in addition, other vehicles such as a motorcycle that is traveling.

An example of the separation processing will be described. The processing unit 11 coordinate-converts the relative position of the point cloud data into a position centered on the position of the subject vehicle 101, indicates the road RD on the X-Y two-dimensional map corresponding to the depth direction and the road width direction, for example, as viewed from above, and forms the two-dimensional map into grids having a predetermined size. In a case where the difference between the maximum value and the minimum value of the data in the grid in each grid is smaller than a predetermined threshold, the processing unit 11 determines that the data of the grid indicates a flat road surface. On the other hand, in a case where the difference between the maximum value and the minimum value of the data in the grid is larger than the predetermined threshold, the processing unit 11 determines that the data of the grid indicates a three-dimensional object or the like.

Note that as a method of determining whether the point cloud data corresponds to the data of the road surface or the three-dimensional object or the like, another method may be used.

In step S30, the gradient calculation unit 114 calculates the road surface gradient of the road RD in the traveling direction based on the data of the grid separated as the data of the road surface, and proceeds to step S40. An example of the road surface gradient calculation processing is as described with reference to FIGS. 3A to 3D.

Note that as the road surface gradient calculation method, another method may be used.

In step S40, the processing unit 11 acquires the maximum depth distance L by the gradient calculation unit 114, and proceeds to step S50 in FIG. 9.

As described above, the maximum depth distance L is the farthest depth distance that can be detected by the LiDAR 5. The gradient calculation unit 114 of the processing unit 11 acquires, as the maximum depth distance L, the depth distance corresponding to the data of the grid farthest from the position of the subject vehicle 101 among the grids extracted at the time of the road surface gradient calculation processing.

In step S50, the processing unit 11 calculates the light projection angle α in the vertical direction and the distance DL to the road surface point at each depth distance X, and proceeds to step S60. The relationship between the vertical direction angle and the depth distance X is as illustrated in FIG. 5A. In addition, the relationship among the depth distance X, the height Z of the road surface, and the distance DL to the road surface is as illustrated in FIG. 4B.

Note that in a case where the maximum depth distance L is shorter than the required depth distance N, the gradient calculation unit 114 of the processing unit 11 predicts a road surface gradient farther than the maximum depth distance L. A prediction result of the road surface gradient is as illustrated in FIG. 8. The processing unit 11 calculates the light projection angle α in the vertical direction and the distance DL to the road surface point in each depth distance X, based on the measurement data up to the maximum depth distance L that has been actually acquired by the LiDAR 5 and the prediction result of the road surface gradient that has been predicted by the gradient calculation unit 114.

In step S60, the processing unit 11 calculates the required angular resolution at each depth distance X, and proceeds to step S70 in FIG. 9B. The required angular resolution means an angular resolution required for detecting a detection target having a size that has been designated beforehand. The relationship between the depth distance X and the angular resolution is as illustrated in FIG. 5B.

In step S70 of FIG. 9B, the processing unit 11 determines whether the enlargement requirement for enlarging the area where the irradiation point density is set to be high is satisfied. In an embodiment, as described above for the determination unit 113, the enlargement requirement for enlarging the area where the irradiation point density is set to be high (for example, for enlarging the depth distance width to set the angular resolution equal to or smaller than 0.1 deg to the LiDAR 5) has been determined beforehand.

In a case where at least one of the three requirements (1) to (3) is satisfied, the processing unit 11 makes an affirmative determination in step S70, and proceeds to step S80. In a case where none of the three requirements (1) to (3) is satisfied, the processing unit 11 makes a negative determination in step S70, and proceeds to step S90.

In step $80, the processing unit 11 sends an instruction to enlarge the high-resolution area in the FOV (in other words, enlarge an area in the FOV in which the irradiation point density is set to be high) to the determination unit 113, and proceeds to step S90.

In step S90, the processing unit 11 determines whether a predetermined resolution threshold is exceeded. As an example, a determination based on the relationship between the depth distance X and the angular resolution in the vertical direction illustrated in FIG. 5B is made. As a result, in a case where the required angular resolution required for recognizing the detection target becomes smaller than the setting limit (for example, 0.05 deg) of the angular resolution for the LiDAR 5 by enlarging the high-resolution area in the FOV, an affirmative determination is made in step S90, and the processing proceeds to step S95. In a case where the required angular resolution does not exceed the setting limit even though the high-resolution area is enlarged in the FOV, the processing unit 11 makes a negative determination in step S90, and proceeds to step S100. The setting limit means an angular resolution at which the operation of the LiDAR 5 is guaranteed.

Figure 10A:
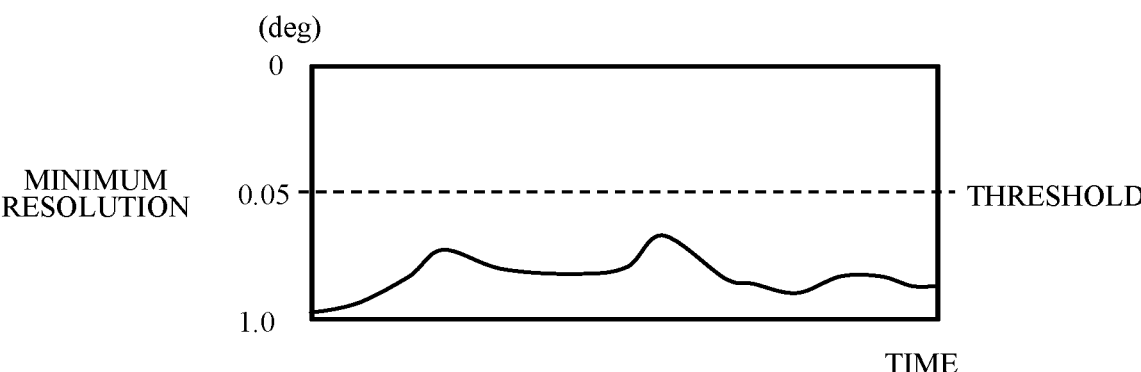
FIG. 10A is a schematic diagram illustrating determination processing in step S90.

FIG. 10A is a schematic diagram illustrating determination processing in step S90 described above. The horizontal axis represents a time axis, and corresponds to an elapsed time from the start of the self-driving. The vertical axis represents the required angular resolution, and represents a minimum value of the required angular resolution in the FOV. That is, a curved line illustrated in FIG. 10A indicates a temporal change in the minimum value of the required angular resolution. In the curved line, a part that exceeds a resolution threshold (an angular resolution that can be set to the LiDAR 5) indicated by a broken line corresponds to a case where the affirmative determination is made in step S90.

Figure 10B:
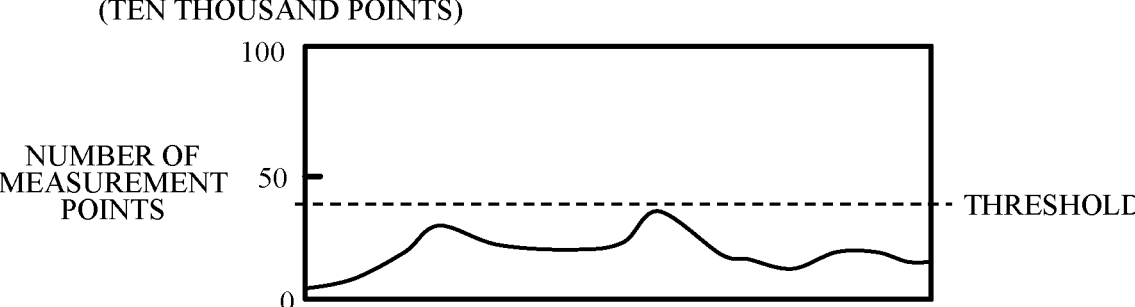
FIG. 10B is a schematic diagram illustrating determination processing in step S90.

FIG. 10B is a schematic diagram illustrating determination processing in step S100. The horizontal axis represents a time axis, and corresponds to an elapsed time from the start of the self-driving. The vertical axis represents the number of irradiation points (the number of measurement points), and represents the total number of irradiation points set in the FOV. That is, a curved line illustrated FIG. 10B indicates a temporal change in the number of irradiation points in the FOV. A part that exceeds an irradiation point number threshold (a smaller one of the number of irradiation points that can be set to the LiDAR 5 and the number of measurement points that can be arithmetically operated by the processing unit 11) indicated by a broken line in the curved line corresponds to a case where the affirmative determination is made in step S100. The setting limit in the case of FIG. 10B denotes the number of irradiation points at which the operation of the LiDAR 5 and the operation of the processing unit 11 are guaranteed.

Figure 10C:
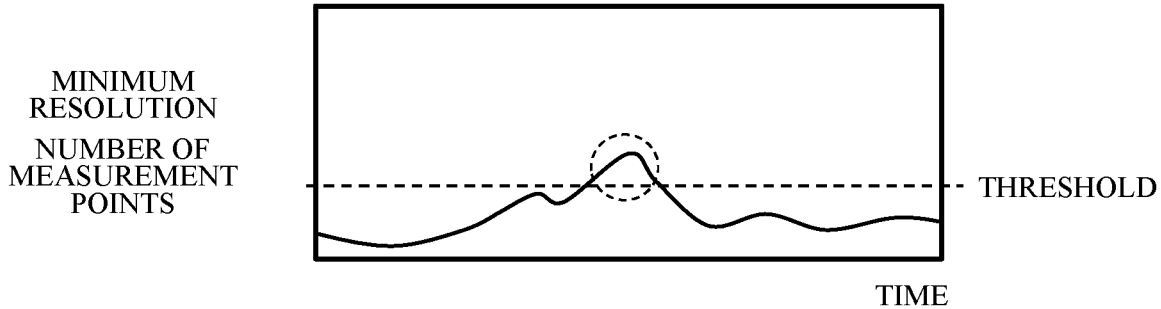
FIG. 10C is a schematic diagram illustrating determination processing in step S90.

FIG. 10C is another schematic diagram for describing the determination processing in steps S90 and S100, and illustrates a case where the curved line in FIG. 10A or FIG. 10B exceeds a threshold indicated by a broken line (a resolution threshold or an irradiation point number threshold). Note that the avoidance measures unit 115 actually takes excess avoidance measures in steps S95 and S105, and the curved line does not exceed the setting limit.

In step S95, the processing unit 11 causes the avoidance measures unit 115 to take the excess avoidance measures to avoid the setting that exceeds the setting limit of the LiDAR 5, and proceeds to step S100. The avoidance measures are as described above.

In addition, in step S105, the processing unit 11 causes the avoidance measures unit 115 to take the excess avoidance measures to avoid the settings that exceed the setting limits of the LiDAR 5 and the processing unit 11, and then proceeds to step S110. The 15 avoidance measures are as described above.

In step S110, the processing unit 11 causes the determination unit 113 to determine the angular resolution in the vertical direction to be the required angular resolution, and proceeds to step S120. In an embodiment, the angular resolution in the vertical direction is determined prior to the angular resolution in the horizontal direction. 20 In step S120, the determination unit 113 of the processing unit 11 determines the angular resolution in the horizontal direction to be the required angular resolution, and proceeds to step S130. By determining the angular resolution in the horizontal direction after the angular resolution in the vertical direction, it becomes easy to make the angular resolution in the horizontal direction match the angular resolution in the vertical direction.

In step S130, the processing unit 11 determines the coordinates of the detection point. More specifically, the coordinates indicating the position of the detection point as exemplified by the black circles in FIG. 6B are determined. The recognition unit 111 recognizes a three-dimensional object or the like in the advancing direction of the road RD on which the subject vehicle 101 travels, based on the detection data detected at the position of the detection point determined in step S130.

Note that whenever the point cloud data is acquired in step S10, the processing unit 11 maps the relative position of the three-dimensional object or the like based on the point cloud data on the X-Y two-dimensional map, and generates position data that is continuous in a two-dimensional manner. Then, the relative position of the three-dimensional object or the like based on the point cloud data can be converted into the coordinates with the position of the subject vehicle 101 as the center and recorded on the two-dimensional map.

In step S140, the processing unit 11 determines whether to end the processing. In a case where the subject vehicle 101 is continuously traveling in the self-drive mode, the processing unit 11 makes a negative determination in step S140, returns to step S10 in FIG. 9A, and repeats the above-described processing. By returning to step S10 in FIG. 9A, the determination or the like of the coordinates of the detection point based on the point cloud data is periodically and repeatedly made, while the subject vehicle 101 is traveling. On the other hand, in a case where the subject vehicle 101 has finished traveling in the self-drive mode, the processing unit 11 makes an affirmative determination in step S140, and ends the processing of FIG. 9B.

According to the embodiments described above, the following operations and effects are obtained.

(1) The external environment recognition apparatus 50 includes the LiDAR 5 as an in-vehicle detector that scans and irradiates irradiation light as an electromagnetic wave in the horizontal direction as a first direction and in the vertical direction as a second direction intersecting the first direction and that detects an external environment situation in the surroundings of the subject vehicle 101, and the processing unit 11 as a road surface information acquisition unit that acquires road surface information of the road RD on which the subject vehicle 101 travels, based on the detection data of the LiDAR 5. The processing unit 11 includes: the recognition unit 111 that recognizes the road surface and a three-dimensional object on the road RD in every frame as the road surface information, based on the three-dimensional point cloud data including the distance information for every one of the plurality of detection points in the matrix shape acquired in every frame by the LiDAR 5; the determination unit 113 that determines, as the scanning angular resolution of the irradiation light, an interval of the detection points of the three-dimensional point cloud data of the next frame for use in the recognition by the recognition unit 111, based on a predetermined size (for example, 15 cm in both the vertical direction and the horizontal direction) of the three-dimensional object that has been predetermined as the recognition target and the distance (for example, 100 m) from the subject vehicle 101 to the three-dimensional object; and the avoidance measures unit 115 that takes predetermined avoidance measures so that at least one of the scanning angular resolution and the number of detection points corresponding to the interval of the detection points does not exceed a setting limit as a predetermined limit value.

With this configuration, it becomes possible to avoid setting a small scanning angular resolution that exceeds the setting limit to the LiDAR 5 and setting the number of detection points that exceed the setting limit of the LiDAR 5 and the number of detection points that exceed the processing limit of the processing unit 11.

In addition, by controlling the interval of the detection points based on the predetermined size of the three-dimensional object that has been determined beforehand as the recognition target and the distance from the subject vehicle 101 to the three-dimensional object, the total number of pieces of the detection data for use in the recognition processing can be suppressed, as compared with a case where the interval of the detection points is made narrower than necessary. That is, the processing load of the processing unit 11 can be reduced without degrading the recognition accuracy of the position or the size of the object or the like to be a detection target of the external environment recognition apparatus 50.

Furthermore, in an embodiment, even when the subject vehicle 101 travels on the road RD that is not included in the high-precision map information, the road RD on which the subject vehicle 101 travels for the first time in a state in which the high-precision map information is not provided, and the road RD that changes to a situation different from the high-precision map information due to construction work or the like, it is possible to determine the scanning angular resolution of the irradiation light corresponding to the interval of the detection points required for the recognition unit 111 to recognize the above three-dimensional object at each depth distance X, while acquiring the depth distance X to the road surface of the road RD in the advancing direction on every detection point by using the LiDAR 5.

(2) In the external environment recognition apparatus of the above (1), when at least one of a case where the vehicle speed of the subject vehicle 101 increases, a case where the road surface ahead of the subject vehicle 101 is an upper gradient, and a case where the farthest maximum depth distance L to be detectable by the LiDAR 5 is shorter than a predetermined distance (for example, the required depth distance N) is satisfied, the determination unit 113 enlarges the area where the interval of the detection points is set to be narrower than the predetermined interval (for example, 0.1 deg) (in other words, the detection point density is set to be high), and the avoidance measures unit 115 takes avoidance measures so that the area enlarged by the determination unit 113 does not cause at least one of the scanning angular resolution and the number of detection points to exceed the limit value.

With this configuration, while the determination unit 113 determines the interval of the detection points of the three-dimensional point cloud data for use in the recognition by the recognition unit 111 in real time, even if the traveling state (the vehicle speed) of the subject vehicle 101 and the state of the road RD on which the subject vehicle travels (a gradient, reflectance of a road surface, or the like) change, it becomes possible to appropriately control the interval of the detection points without a small scanning angular resolution that exceeds the setting limit being set to the LiDAR 5 or the number of detection points that exceeds the setting limit of the LiDAR 5 and the number of detection points that exceeds the processing limit of the processing unit 11 being set.

(3) In the external environment recognition apparatus of the above (1) or (2), the avoidance measures unit 115 limits the vehicle speed of the subject vehicle 101.

With this configuration, while the determination unit 113 determines the interval of the detection points of the three-dimensional point cloud data for use in the recognition by the recognition unit 111 in real time, even if the state of the road RD on which the subject vehicle 101 travels (the gradient, the reflectance of a road surface, or the like) changes, the vehicle speed in the self-drive is automatically limited, and it becomes possible to appropriately control the interval of the detection points without a small scanning angular resolution that exceeds the setting limit being set to the LiDAR 5 or the number of detection points that exceeds the setting limit of the LiDAR 5 and the number of detection points that exceeds the processing limit of the processing unit 11 being set.

(4) In the external environment recognition apparatus of the above (1) or (2), the avoidance measures unit 115 prompts the occupant of the subject vehicle 101 to take the avoidance measures.

With this configuration, it is possible to notify the occupant, for example, via the notification unit 6 that there is a risk that a small scanning angular resolution that exceeds the setting limit is set to the LiDAR 5 due to a change in one of the traveling state (the vehicle speed) of the subject vehicle 101 and the state of the road RD on which the subject vehicle travels (the gradient, the reflectance of a road surface, and the like) or the number of detection points that exceeds the setting limit of the LiDAR 5 and the number of detection points that exceeds the processing limit of the processing unit 11 are set. The occupant manually performs, for example, an avoidance operation such as decelerating the vehicle speed of the subject vehicle 101, so that the settings that exceed the setting limits of the LiDAR 5 and the processing unit 11 can be avoided.

(5) In the external environment recognition apparatus of the above (4), the avoidance measures unit 115 notifies the occupant of the vehicle speed in order to keep the scanning angular resolution or the number of detection points within the limit value.

With this configuration, for example, the occupant can be notified of to what extent the vehicle speed should be decelerated via the notification unit 6. The occupant performs the deceleration operation to reach such a vehicle speed, so that the settings that exceed the setting limits of the LiDAR 5 and the processing unit 11 can be avoided.

(6) In the external environment recognition apparatus of the above (1) or (2), the avoidance measures unit 115 lowers the frame rate at which the LiDAR 5 acquires the three-dimensional point cloud data, and loosens the limit value.

With this configuration, the limit value that can be set to the LiDAR 5 and the limit value that can be calculated by the processing unit 11 become gentle in appearance, so that the settings that exceed the setting limits of the LiDAR 5 and the processing unit 11 can be avoided.

(7) In the external environment recognition apparatus of the above (1) or (2), the avoidance measures unit 115 reduces the self-drive level of the subject vehicle 101.

With this configuration, by avoiding the settings that exceed the setting limits of the LiDAR 5 and the processing unit 11, it becomes possible to take appropriate measures such as lowering the self-drive level, when maintaining the self-drive level is hindered.

The above embodiments can be modified in various modes. Hereinafter, modifications will be described.

(First Modification)

In the above-described embodiment, the example in which the external environment recognition apparatus 50 causes the LiDAR 5 to detect the road surface situation in the advancing direction of the subject vehicle 101 has been described. Instead of this, for example, the LiDAR 5 having an FOV in which 360 deg is detectable in the surroundings of the subject vehicle 101 may be provided, and the LiDAR 5 may be caused to detect the road surface situation of the entire surroundings of the subject vehicle 101.

(Second Modification)

The numerical values such as the value of the required depth distance N (100 m, 108 m, or the like) and the value or the like of the angular resolution (0.05, 0.1, 0.2, 0.3, 0.4) set to the LiDAR 5 are merely examples, and may be appropriately changed.

The above embodiment can be combined as desired with one or more of the above modifications. The modifications can also be combined with one another.

According to the present invention, it becomes possible to appropriately control the interval of the detection points on which the in-vehicle detector irradiates the electromagnetic wave.

Above, while the present invention has been described with reference to the preferred embodiments thereof, it will be understood, by those skilled in the art, that various changes and modifications may be made thereto without departing from the scope of the appended claims.

What is claimed is:

1. A steering apparatus comprising:
an in-vehicle detector configured to scan and emit an electromagnetic wave in a first direction and a second direction intersecting the first direction to detect an external environment situation around a subject vehicle;
a microprocessor configured to acquire road surface information of a road on which the subject vehicle travels based on detection data of the in-vehicle detector; and
a memory coupled to the microprocessor, wherein
the microprocessor is configured to perform:
recognizing a road surface of the road and a three-dimensional object on the road for each frame as the road surface information based on three-dimensional point cloud data including distance information for every one of a plurality of detection points in a matrix shape acquired in every frame by the in-vehicle detector;
determining an interval of detection points of the three-dimensional point cloud data of a next frame used for recognition in the recognizing as a scanning angular resolution of the electromagnetic wave based on a size of a predetermined three-dimensional object as a recognition target and a distance from the subject vehicle to the predetermined three-dimensional object; and
taking a predetermined avoidance measure so that at least one of the scanning angular resolution and a number of detection points corresponding to the interval of detection points does not exceed a predetermined limit value.

2. The external environment recognition apparatus according to claim 1, wherein the microprocessor is configured to perform:
the determining including, when at least one of a case where a vehicle speed of the subject vehicle increases, a case where the road surface ahead of the subject vehicle is an upper gradient, and a case where a farthest maximum depth distance to be detectable by the in-vehicle detector is shorter than a predetermined distance is satisfied, enlarging an area where the interval of detection points is set to be narrower than a predetermined interval; and
the taking including taking the avoidance measure so that an enlargement of the area in the enlarging does not cause at least one of the scanning angular resolution and the number of detection points to exceed the predetermined limit value.

3. The external environment recognition apparatus according to claim 2, wherein
the predetermined distance corresponds to a braking distance of the subject vehicle, the braking distance changing depending on the vehicle speed, and
the avoidance measure includes limiting the vehicle speed of the subject vehicle in order to keep an extension of the predetermined distance within a predetermined range.

4. The external environment recognition apparatus according to claim 2, wherein
the predetermined distance corresponds to a braking distance of the subject vehicle, the braking distance changing depending on the vehicle speed; and
the avoidance measure includes prohibiting an increase of the vehicle speed of the subject vehicle in order to maintain the predetermined distance.

5. The external environment recognition apparatus according to claim 1, wherein the avoidance measure is limiting a vehicle speed of the subject vehicle.

6. The external environment recognition apparatus according to claim 1, wherein
the microprocessor is configured to perform:
the taking including prompting an occupant of the subject vehicle to take the avoidance measure.

7. The external environment recognition apparatus according to claim 6, wherein
the microprocessor is configured to perform:
the taking including notifying the occupant of the vehicle speed of the subject vehicle in order to keep the scanning angular resolution or the number of detection points within the predetermined limit value.

8. The external environment recognition apparatus according to claim 1, wherein
the avoidance measure is loosening the predetermined limit value by lowering a frame rate at which the in-vehicle detector acquires the three-dimensional point cloud data.

9. The external environment recognition apparatus according to claim 1, wherein
the avoidance measure is reducing a self-drive level of the subject vehicle.

10. The external environment recognition apparatus according to claim 1, wherein
the in-vehicle detector is a LiDAR.

* * * * *